US012449254B2

(12) United States Patent
Honoki et al.

(10) Patent No.: US 12,449,254 B2
(45) Date of Patent: Oct. 21, 2025

(54) LASER MARKER AND PORTABLE TERMINAL DEVICE

(71) Applicant: MAKITA CORPORATION, Anjo (JP)

(72) Inventors: Manami Honoki, Anjo (JP); Yoichiro Koike, Anjo (JP); Masafumi Noda, Anjo (JP)

(73) Assignee: MAKITA CORPORATION, Anjo (JP)

( * ) Notice: Subject to any disclaimer, the term of this patent is extended or adjusted under 35 U.S.C. 154(b) by 1147 days.

(21) Appl. No.: 17/365,277

(22) Filed: Jul. 1, 2021

(65) Prior Publication Data

US 2022/0003545 A1    Jan. 6, 2022

(30) Foreign Application Priority Data

Jul. 1, 2020   (JP) .................................. 2020-114359

(51) Int. Cl.
    *G01C 9/06*      (2006.01)
    *G08C 17/02*     (2006.01)
    *G01C 15/02*     (2006.01)

(52) U.S. Cl.
    CPC .............. *G01C 9/06* (2013.01); *G08C 17/02* (2013.01); *G01C 2009/066* (2013.01)

(58) Field of Classification Search
    CPC .... G01C 9/06; G01C 15/02; G01C 2009/066; G08C 17/02
    USPC .......................................................... 33/286
    See application file for complete search history.

(56) References Cited

U.S. PATENT DOCUMENTS 8,943,701 B2 *  2/2015  Hayes .................. G01C 15/002
                                                            33/1 G

FOREIGN PATENT DOCUMENTS

| JP | 2001191271 A | * | 7/2001 |
| JP | 5344215 B2 | * | 11/2013 |
| JP | 2017-037016 A | | 2/2017 |
| JP | 2017-150836 A | | 8/2017 |
| JP | 6628633 B2 | | 1/2020 |

OTHER PUBLICATIONS

Nov. 21, 2023 Office Action issued in Japanese Patent Application No. 2020-114359.
Apr. 2, 2024 Office Action issued in Japanese Patent Application No. 2020-114359.

* cited by examiner

*Primary Examiner* — John E Breene
*Assistant Examiner* — Daniel M Quinn
(74) *Attorney, Agent, or Firm* — Oliff PLC

(57) ABSTRACT

A laser marker in one aspect of the present disclosure includes a support body, a rotation body, a motor, a laser beam emitter, a device communicator, and a motor control circuit. The device communicator performs a wireless communication with a portable terminal device and with a beam receiving device. The portable terminal device transmits a rotation start command signal. The beam receiving device generates and transmits a bean receiving position signal. The motor control circuit starts controlling a rotation of the motor based on the beam receiving position signal in response to the device communicator receiving or having received the rotation start command signal.

11 Claims, 13 Drawing Sheets

LASER MARKER AND PORTABLE TERMINAL DEVICE

CROSS-REFERENCE TO RELATED APPLICATIONS

This application claims the benefit of Japanese Patent Application No. 2020-114359 filed on Jul. 1, 2020 with the Japan Patent Office, the entire disclosure of which is incorporated herein by reference.

BACKGROUND

The present disclosure relates to a laser marker.

Japanese Patent No. 6628633 discloses a laser marker configured to be manipulated with a remote controller. The remote controller includes a beam receiver. The remote controller is placed away from the laser marker. The beam receiver receives a laser beam emitted from the laser marker. The remote controller transmits a beam receiving position signal in accordance with a receiving position of the laser beam in the beam receiver. The laser marker has an automatic tracking function. In the automatic tracking function, the laser marker rotates in accordance with a received beam receiving position signal, to thereby adjust a position of the laser beam to the center of the beam receiver.

SUMMARY

The above automatic tracking function is activated in response to a manipulation of a switch provided to the remote controller. Thus, a user of the laser marker is required to go closer to the remote controller in order to activate the automatic tracking function. Consequently, the automatic tracking function may decrease its work efficiency.

In one aspect of the present disclosure, it is desirable to improve work efficiency of an automatic tracking function of a laser marker.

A laser marker (or a laser level or a laser levelling device) in one aspect of the present disclosure includes a support body, a rotation body, a motor, a laser beam emitter, a device communicator, and a motor control circuit. The rotation body is rotatably provided to the support body. The motor rotates the rotation body. The laser beam emitter is provided to the rotation body. The laser beam emitter emits a laser beam. The device communicator performs a wireless communication with a portable terminal device and with a beam receiving device. The portable terminal device transmits a rotation start command signal. The rotation start command signal demands to start rotating the motor. The beam receiving device generates and transmits a beam receiving position signal in accordance with a receiving position of the laser beam in the beam receiving device. The device communicator receives the beam receiving position signal. The motor control circuit starts controlling the motor based on the beam receiving position signal in response to the device communicator receiving or having received the rotation start command signal.

The laser marker as mentioned above starts an automatic tracking in response to receipt of the rotation start command signal transmitted from the portable terminal device. Thus, a user of the laser marker enables the laser marker to start the automatic tracking via the portable terminal device. That is, the user does not have to go closer to the beam receiving device. Consequently, it is possible to improve work efficiency of an automatic tracking function of the laser marker.

At least one of the support body, the rotation body, the motor, the laser beam emitter, the device communicator, or the motor control circuit may be removed from the laser marker.

The device communicator may include a first device communicator and/or a second device communicator. The first device communicator is configured to perform a first wireless communication with the beam receiving device. The second device communicator is configured to perform a second wireless communication with the portable terminal device.

In a case where the laser marker includes both the first device communicator and the second device communicator, the second device communicator performs the second wireless communication, which is distinct from the first wireless communication performed by the first device communicator. Thus, it is possible to inhibit the second wireless communication from interfering with the first wireless communication.

The laser marker may further include a first communication control circuit. The first communication control circuit may be configured to, in response to the device communicator receiving or having received a first completion notification signal, transmit a second completion notification signal to the portable terminal device via the device communicator. The first completion notification signal may be transmitted by the beam receiving device in response to the receiving position of the laser beam coinciding or having coincided with a reference position. The second completion notification signal may correspond to (or may be associated with or may be related to) the first completion notification signal.

In a case where the laser marker further includes the first communication control circuit, the laser marker transmits the second completion notification signal to the portable terminal device in response to receipt of the first completion notification signal. This enables the user to identify, via the portable terminal device, that the automatic tracking has completed.

The first communication control circuit may be configured to transmit an error notification signal to the portable terminal device via the device communicator in response to the device communicator failing or having failed to receive the first completion notification signal within a specified time period. This enables the user to identify, via the portable terminal device, that the automatic tracking has not completed.

The portable terminal device may be configured to transmit a rotation stop command signal. The rotation stop command signal may demand to stop rotating the motor. The motor control circuit may be configured to stop the motor in response to the device communicator receiving or having received the rotation stop command signal. This enables the user to stop the automatic tracking via the portable terminal device. That is, the user does not have to go closer to the beam receiving device.

The laser marker may further include a second communication control circuit. The second communication control circuit may be configured to transmit a command reception-completed notification signal to the portable terminal device via the device communicator in response to the device communicator receiving or having received the rotation start command signal.

In a case where the laser marker further includes the second communication control circuit, the laser marker transmits the command reception-completed notification signal to the portable terminal device in response to receipt of the rotation start command signal from the portable terminal device. This enables the user to identify, via the portable terminal device, that the automatic tracking has started.

A portable terminal device in another aspect of the present disclosure includes a terminal communicator, a rotation command receiver, and a command output circuit. The terminal communicator performs a wireless communication with a laser marker. The laser marker includes: a support body; a rotation body rotatably provided to the support body; a motor configured to rotate the rotation body; and/or a laser beam emitter provided to the rotation body, the laser beam emitter being configured to emit a laser beam. The rotation command receiver receives a user rotation command from a user of the portable terminal device. The user rotation command demands to start rotating the motor. The command output circuit transmits a rotation start command signal to the laser marker via the terminal communicator in response to the rotation command receiver receiving or having received the user rotation command. The rotation start command signal corresponds to (or is associated with or is related to) the user rotation command. The laser marker starts controlling the motor based on a beam receiving position signal transmitted by a beam receiving device in response to receipt of the rotation start command signal. The beam receiving device generates and transmits the beam receiving position signal in accordance with a receiving position of the laser beam in the beam receiving device. The laser marker receives the beam receiving position signal.

At least one of the terminal communicator, the rotation command receiver, or the command output circuit may be removed from the portable terminal device.

The portable terminal device as mentioned above transmits the rotation start command signal to the laser marker in response to receipt of the user rotation command. The laser marker starts an automatic tracking in response to receipt of the rotation start command signal. Thus, the user enables the laser marker to start the automatic tracking via the portable terminal device. That is, the user does not have to go closer to the beam receiving device. Consequently, it is possible to improve work efficiency of the automatic tracking function of the laser marker.

The portable terminal device may further include a display. The display may be configured to provide display information in response to the terminal communicator receiving or having received device information. The device information may be transmitted by the laser marker. The display information may correspond to (or may be associated with or may be related to) the device information.

In a case where the portable terminal device further includes the display, the portable terminal device causes the display to provide the display information in response to the terminal communicator receiving or having received the device information. This enables the user to visually confirm, via the portable terminal device, information relating to the laser marker.

The beam receiving device may transmit a first completion notification signal to the laser marker in response to the receiving position of the laser beam coinciding or having coincided with a reference position. The laser marker may transmit a second completion notification signal to the terminal communicator in response to receipt of the first completion notification signal. The second completion notification signal may correspond to the first completion notification signal. The device information may include the second completion notification signal. Accordingly, the user can visually confirm whether the automatic tracking has completed via the portable terminal device.

The laser marker may transmit an error notification signal to the terminal communicator in response to the laser marker failing to or having failed to receive the first completion notification signal within a specified time period. The device information may include the error notification signal. Accordingly, the user can visually confirm, via the portable terminal device, that the automatic tracking has failed to complete.

The laser marker may transmit a command reception-completed notification signal to the terminal communicator in response to receipt of the rotation start command signal. The device information may include the command reception-completed notification signal. Accordingly, the user can visually confirm, via the portable terminal device, that the automatic tracking has started.

The portable terminal device may further include a stop command receiver. The stop command receiver may be configured to receive a user stop command from the user. The user stop command may demand to stop rotating the motor. The command output circuit may be configured to transmit a rotation stop command signal to the laser marker via the terminal communicator in response to the stop command receiver receiving or having received the user stop command. The rotation stop command signal may correspond to (or may be associated with or may be related to) the user stop command.

In a case where the portable terminal device further includes the stop command receiver, the portable terminal device transmits the rotation stop command signal to the laser marker in response to receipt of the user stop command. This enables the user to stop the automatic tracking via the portable terminal device. That is, the user does not have to go closer to the beam receiving device.

A method of commanding a laser marker to rotate via a portable terminal device according to still another aspect of the present disclosure including: obtaining a user rotation command input by a user of the portable terminal device, the user rotation command demanding to start rotating a motor of a laser marker, the laser marker including: a support body, a rotation body rotatably provided to the support body; and a laser beam emitter provided to the rotation body, the laser beam emitter being configured to emit a laser beam, and the motor being configured to rotate the rotation body; and transmitting a rotation start command signal to the laser marker in response to obtainment of the user rotation command, the rotation start command signal corresponding to (being associated with or being related to) the user rotation command, the laser marker being configured to start controlling the motor based on a beam receiving position signal transmitted from a beam receiving device in accordance with receipt of the rotation start command signal, the beam receiving device being configured to generate and transmit the beam receiving position signal in accordance with a receiving position of the laser beam in the beam receiving device, and the laser marker being configured to receive the beam receiving position signal.

The portable terminal device exerts the same effect(s) as in the above portable terminal device by executing the method as mentioned above.

The above method may further include obtaining device information transmitted from the laser marker and showing display information on a display of the portable terminal device. The laser marker may be configured to transmit the device information.

The portable terminal device can show information relating to the laser marker on the display by executing the above method. Consequently, the user can visually confirm, via the portable terminal device, the information relating to the laser marker.

BRIEF DESCRIPTION OF THE DRAWINGS

An example embodiment of the present disclosure will be described hereinafter by way of example with reference to the accompanying drawings, in which.

DETAILED DESCRIPTION OF EXEMPLARY EMBODIMENTS

It should be noted that the present disclosure is not limited to the embodiment below and may be practiced in various forms as long as it falls within the technical scope of the present disclosure.

<1. Overall Configuration>

<1-1. System>

Figure 1:
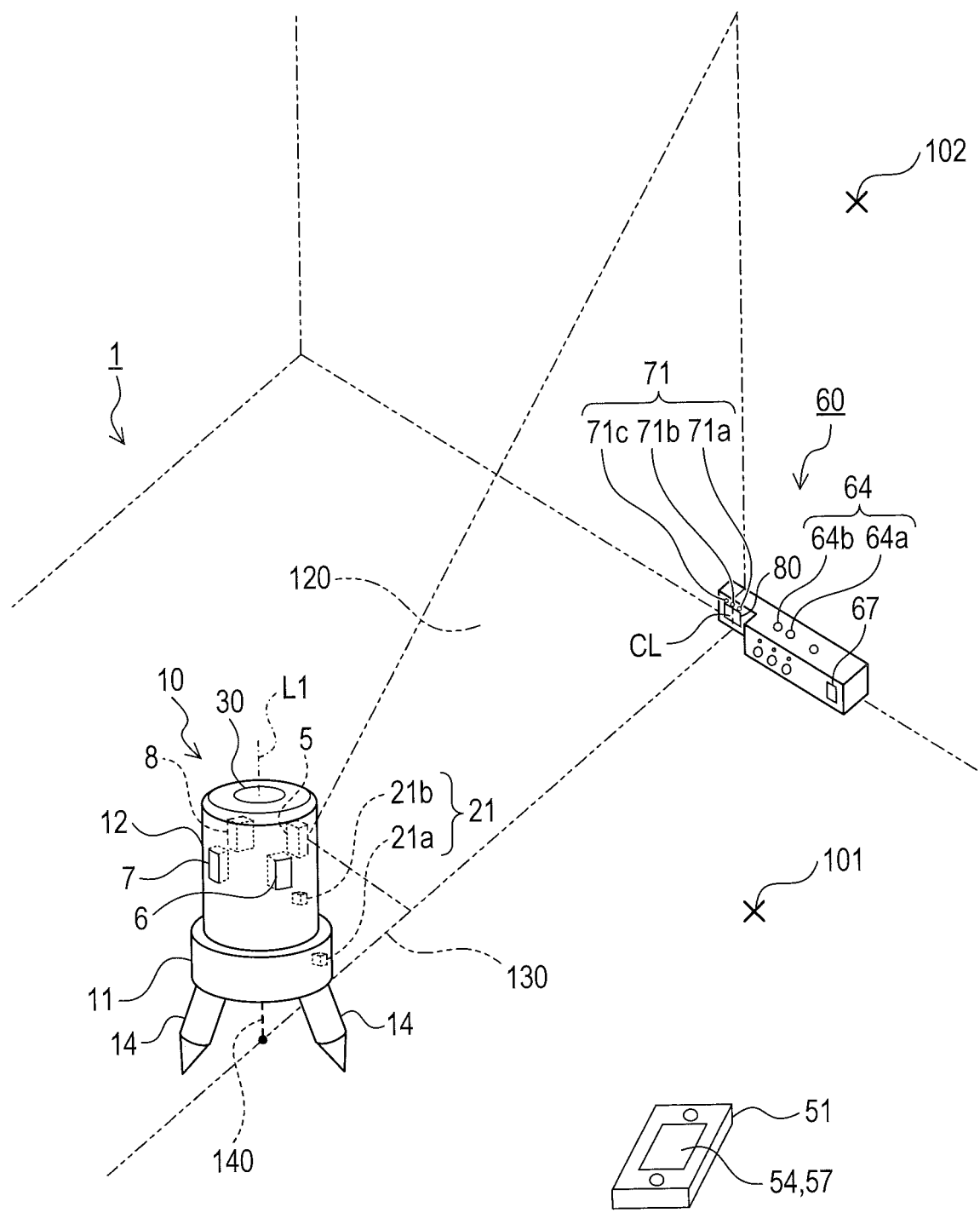
FIG. 1 is a schematic view of a laser marking system according to the present embodiment.

As shown in FIG. 1, a laser marking system 1 according to the present embodiment includes a laser marker 10, a portable terminal device 51, and a beam receiving device 60. In another embodiment, the portable terminal device 51 or the beam receiving device 60 may be removed from the laser marking system 1.

The laser marker 10 projects a laser beam onto an object. The projected laser beam indicates a reference line. The laser marking system 1 is configured such that the portable terminal device 51 or the beam receiving device 60 controls a rotation of the laser marker 10, specifically a position of the laser beam, at a position distanced from the laser marker 10.

<1-2. Laser Marker>

The laser marker 10 includes a support body 11 and a rotation body 12. The support body 11 includes legs 14. In the present embodiment, the support body 11 includes three legs 14. The support body 11 is supported by the legs 14 on a floor 101. Hereinafter, the floor 101 or a surface other than the floor 101, on which the laser marker 10 is placed, is also referred to as a placement surface.

The rotation body 12 is rotatably provided to the support body 11 so as to rotate about a center axis L1 with respect to the support body 11. In FIG. 1, the laser marker 10 is placed such that the center axis L1 is vertical to the placement surface.

The rotation body 12 is formed into substantially a cylindrical shape and extends along the center axis L1. The rotation body 12 includes a first emitter 5, a second emitter 6, a third emitter 7, and a fourth emitter 8. The first to the fourth emitters 5 to 8 each emit a laser beam outward of the laser marker 10. The rotation body 12 includes, in its upper surface, a user interface 30.

The first to the fourth emitters 5 to 8 are arranged at a specified interval (for example, at a 90° interval) along a circumferential direction of the rotation body 12. The first to the fourth emitters 5 to 8 each include a laser beam emitter 34 (see FIG. 2). The laser beam emitter 34 generates the laser beam. The laser beam emitter 34 may include various kinds of laser beam emitting element. For example, the laser beam emitter 34 may include a semiconductor laser, a gas laser, and/or a solid-state laser. The laser beam emitter 34 may be configured to generate the laser beam with another technique. The laser beam emitter 34 is configured to polarize the laser beam in a vertical direction, to thereby emit a vertical laser beam 120 outward of the laser marker 10. The vertical laser beam 120 indicates a vertical reference line.

The rotation body 12 may include a fifth emitter in addition to the first to the fourth emitters 5 to 8. The fifth emitter emits a horizontal laser beam outward of the rotation body 12. The horizontal laser beam indicates a horizontal reference line. The rotation body 12 may include at least one additional emitter, in addition to the fifth emitter, in accordance with a beam divergence of the horizontal laser beam. The at least one additional emitter emits a horizontal laser beam. If each horizontal laser beam has a beam divergence of 110° and the rotation body 12 includes three additional emitters as well as the fifth emitter, the rotation body 12 can emit four horizontal laser beams that overlap with one another, ranging 360° (the full sphere).

In FIG. 1, the vertical laser beam 120 is emitted across a range from the floor 101 to a wall surface 102. The vertical laser beam 120 is emitted from the first emitter 5 of the laser marker 10, which is placed on the floor 101. Furthermore, in FIG. 1, the vertical laser beam 120 is emitted along a ground marker line 130. The laser marker 10 may emit a downward laser beam 140 toward a lower side of the center axis L1 (in other words, a direction toward the placement surface). The ground marker line 130 is provided on the floor 101.

The laser marker 10 has multiple operation modes. The multiple operation modes include a remote controlling mode and an automatic tracking mode. When the laser marker 10 is placed in the remote controlling mode, a user of the laser marking system 1 uses the portable terminal device 51 or the beam receiving device 60 as a remote controller, to thereby change a position and/or an intensity of the vertical laser beam 120, and/or drive the selected number of emitter(s) among the first to the fourth emitters. In the remote controlling mode, the portable terminal device 51 or the beam receiving device 60 transmits a remote controlling signal to the laser marker 10 in accordance with a manipulation of the user. The rotation body 12 rotates in accordance with the remote controlling signal.

In contrast, when the laser marker 10 is placed in the automatic tracking mode, the laser marker 10 automatically changes the position of the vertical laser beam 120, to thereby adjust the position of the vertical laser beam 120 to a reference position. The reference position is determined in a laser beam receiver 65 of the beam receiving device 60, which will be described later. In the automatic tracking mode, a beam receiving position signal is automatically transmitted from the beam receiving device 60 to the laser marker 10 in accordance with a receiving position of the vertical laser beam 120. The rotation body 12 rotates in accordance with the beam receiving position signal. The beam receiving position signal commands the rotation body 12 of the laser marker 10 to stop, rotate clockwise, or rotate counterclockwise in accordance with a rotational position of the rotation body 12. The rotational position of the rotation body 12 corresponds to the reference position, a leftward position to the reference position, or a rightward position to the reference position.

Figure 2:
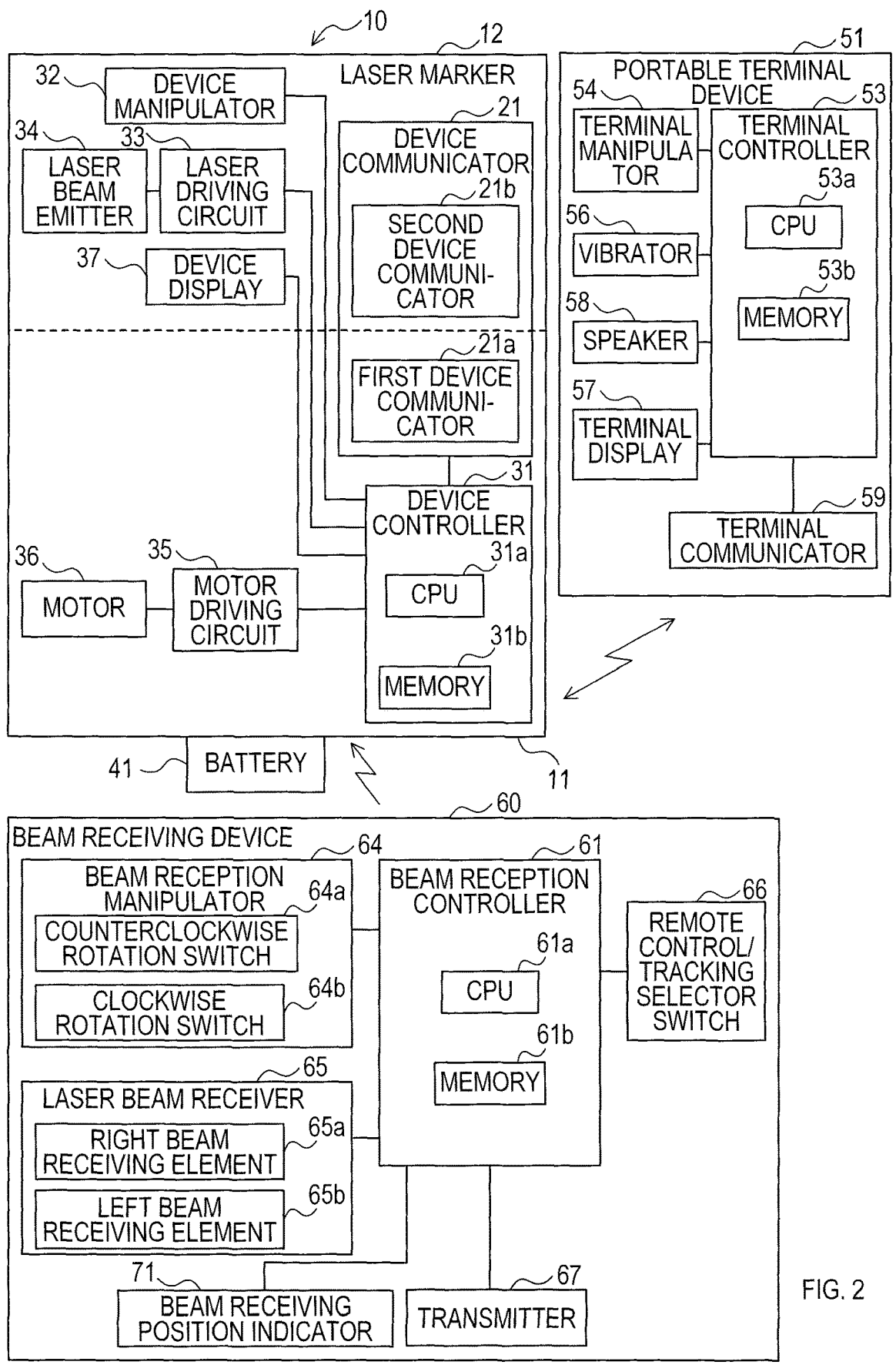
FIG. 2 is a block diagram showing an electrical configuration of the laser marking system.

The laser marker 10 includes a device communicator 21. As shown in FIG. 2, the device communicator 21 includes a first device communicator 21a and a second device communicator 21b. The first device communicator 21a performs a wireless communication (hereinafter, referred to as first wireless communication) in accordance with a first communication protocol (or method). The second device communicator 21b performs a wireless communication (hereinafter, referred to as second wireless communication) in accordance with a second communication protocol (or method). The second communication protocol is distinct from the first communication protocol.

The second device communicator 21b transmits and receives various information to and from the portable terminal device 51. The first device communicator 21a receives the signal (the remote controlling signal, the beam receiving position signal, or the like) transmitted from the beam receiving device 60. The second communication protocol includes a near field wireless communication protocol (or method). The near field wireless communication protocol is, for example, a protocol that conforms to a standard for Bluetooth (Registered Trademark). The first communication protocol is, for example, a protocol that conforms to a standard for infrared communication. In the present embodiment, the Bluetooth protocol is used as the second communication protocol and the infrared communication protocol is used as the first communication protocol.

The first device communicator 21a receives an infrared light transmitted from the beam receiving device 60 and then photoelectrically converts the infrared light, to thereby extract the remote controlling signal or the beam receiving position signal from the infrared light. The first device communicator 21a transmits the extracted remote controlling signal or the extracted beam receiving position signal into the support body 11.

In another embodiment, the first device communicator 21a may be removed from the device communicator 21. In other words, the device communicator 21 may include only the second device communicator 21b. In this case, the first communication protocol conforms to the same communication standard as the second communication protocol and is applied with a modulation that is distinct from a modulation in the second communication protocol. Alternately, in another embodiment, the second device communicator 21b may be removed from the device communicator 21 instead of the first device communicator 21a.

<1-3. Portable Terminal Device>

The portable terminal device 51 includes a function to remotely manipulate the laser marker 10 through a wireless communication. For example, the portable terminal device 51 includes a remote rotation function and a remote laser control function. Additionally, the portable terminal device 51 includes a function to start an automatic tracking.

The portable terminal device 51 includes a terminal communicator 59 (see, FIG. 2). The terminal communicator 59 performs the second wireless communication with the second device communicator 21b of the laser marker 10, to thereby transmit and receive various information to and from the second device communicator 21b. The terminal communicator 59 transmits, for example, a device manipulation signal. The device manipulation signal includes the remote controlling signal and/or an automatic tracking start command signal. The automatic tracking start command signal demands a start of the automatic tracking. Furthermore, the terminal communicator 59 receives, for example, a device information signal. The device information signal includes a signal of indicating device information, such as the "under automatic tracking", "automatic tracking completed", and "tracking error".

<1-4. Beam Receiver>

The beam receiving device 60 includes a function to remotely manipulate the laser marker 10 through a wireless communication. The beam receiving device 60 includes, for example, a remote rotation function and a remote laser control function.

The beam receiving device 60 includes a transmitter 67 and a laser beam receiving window 80. The transmitter 67 performs the first wireless communication with the first device communicator 21a of the laser marker 10, to thereby transmit the remote controlling signal and/or the beam receiving position signal to the first device communicator 21a.

The laser beam receiving window 80 has a rectangular shape. The laser beam receiving window 80 is configured to allow incidence of the vertical laser beam 120 from the laser marker 10 into the beam receiving device 60. In response to the vertical laser beam 120 entering or having entered the laser beam receiving window 80, the laser beam receiver 65 (see, FIG. 2) receives the vertical laser beam 120.

The laser beam receiver 65 is arranged inside the beam receiving device 60. The laser beam receiver 65 is configured into a rectangular shape. The laser beam receiver 65 includes a right beam receiving element 65a and a left beam receiving element 65b. The right beam receiving element 65a and the left beam receiving element 65b may be of the same kind, such as a light receiving diode. The right beam receiving element 65a is arranged rightward of a center line CL. The left beam receiving element 65b is arranged leftward of the center line CL. The center line CL corresponds to the center line (or center position) of the laser beam receiving window 80 and the laser beam receiver 65 in a horizontal direction. That is, the center line CL corresponds to the reference position. The right beam receiving element 65a and the left beam receiving element 65b are in contact with each other on the center line CL.

The beam receiving device 60 is placed on the placement surface such that the center line CL is aligned with the ground marker line 130. When an amount of light received on a right side is greater than an amount of light received on a left side in the beam receiving device 60, the vertical laser beam 120 deviates rightward of the center. The amount of light received on the right side corresponds to an amount of light received by the right beam receiving element 65a. The amount of light received on the left side corresponds to an amount of light received by the left beam receiving element 65b. When the respective amounts of light received on the right side and the left side are equal to each other, the vertical laser beam 120 is located at the center. In other words, the vertical laser beam 120 is aligned with the ground marker line 130. When the amount of light received on the right side is less than the amount of light received on the left side, the vertical laser beam 120 deviates leftward of the center.

When the vertical laser beam 120 is located rightward of the center position, the beam receiving position signal rotates the rotation body 12 leftward. When the vertical laser beam 120 is located leftward of the center position, the beam receiving position signal rotates the rotation body 12 rightward. When the vertical laser beam 120 is located at the center position, the beam receiving position signal stops the rotation body 12.

<2. Electrical Configuration>
<2-1. Laser Marker>

Descriptions are given to an electrical configuration of the laser marking system 1 with reference to FIG. 2.

Figure 3:
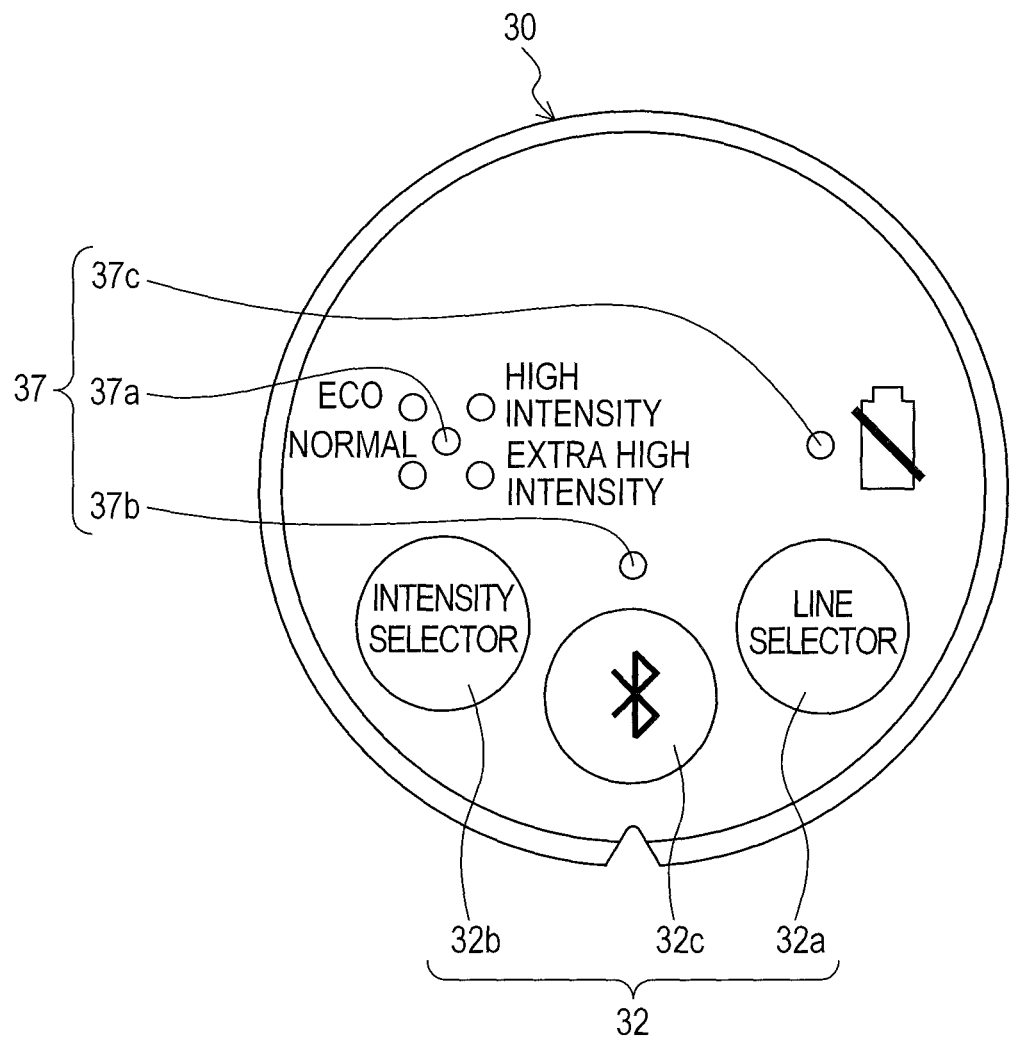
FIG. 3 is a diagram showing an appearance of a user interface of a laser marker according to the present embodiment.

The laser marker 10 includes a device controller 31, a device manipulator 32, a laser driving circuit 33, the laser beam emitter 34, a motor driving circuit 35, a motor 36, a device display 37, the device communicator 21, and a battery 41. In another embodiment, at least one of the device controller 31, the device manipulator 32, the laser driving circuit 33, the laser beam emitter 34, the motor driving circuit 35, the motor 36, the device display 37, the device communicator 21, or the battery 41 may be removed from the laser marker 10. As shown in FIG. 3, the device manipulator 32 and the device display 37 are provided to the user interface 30.

The device controller 31 includes a CPU 31a, a memory 31b, an input/output (I/O) port, and the like. The device controller 31 may be, for example, in the form of a microcomputer. The CPU 31a executes various programs stored in the memory 31b, whereby the device controller 31 achieves functions. In the present embodiment, the device controller 31 corresponds to one example of the motor control circuit, the first communication control circuit, and the second communication control circuit.

The device manipulator 32 includes a line selection manipulator 32a, an intensity selection manipulator 32b, and a wireless communication manipulator 32c. In another embodiment, at least one of the line selection manipulator 32a, the intensity selection manipulator 32b, or the wireless communication manipulator 32c may be removed from the device manipulator 32.

The laser marker 10 includes a first to a third lighting modes. The line selection manipulator 32a is a switch to select one of the lighting modes of the laser marker 10. In the first lighting mode, only the first emitter 5 may be turned on. In the second lighting mode, both the second emitter 6 and the fourth emitter 8 may be turned on. In the third lighting mode, all the emitters from the first to the fourth emitters 5 to 8 may be turned on. In another embodiment, at least one additional lighting mode may be provided. Furthermore, at least one of the first to the third lighting modes may be removed. The first to the fourth emitters 5 to 8 may be turned on in any manner. The laser marker 10 switches various kinds of lighting mode in a specified order every time the line selection manipulator 32a is manipulated.

The laser marker 10 includes four kinds of intensity mode. The four kinds of intensity mode have respective different brightness of the laser beam emitted from the laser marker 10. The intensity selection manipulator 32b is a switch to select one of the intensity modes. The four kinds of intensity mode include, for example, an eco-mode, a normal mode, a high intensity mode, and an extra high intensity mode.

The wireless communication manipulator 32c is a switch to connect the laser marker 10 to the portable terminal device 51 through the second wireless communication. The second device communicator 21b is configured to establish a communication path of the second wireless communication between the laser marker 10 and the portable terminal device 51, which exists within a wireless communication area, in response to the wireless communication manipulator 32c being manipulated or having been manipulated. The wireless communication area corresponds to a wirelessly-communicable area for the second device communicator 21b.

The laser driving circuit 33 causes the laser beam emitter 34 to emit the laser beam with a pulse drive. The pulse drive allows the vertical laser beam 120 to be emitted in an intermittent manner, not in a continuous manner. The laser driving circuit 33 causes the laser beam emitter 34 to emit the laser beam in a constant cycle at a specified duty ratio. A cycle of the pulse drive may be appropriately determined. In the present embodiment, the cycle of the pulse drive is set to the extent (for example, 0.2 msec or less) an afterimage effect allows the user to visually identify the vertical laser beam 120 as being continuously emitted.

The motor driving circuit 35 drives the motor 36. The motor driving circuit 35 controls a driving current flowing through the motor 36 based on a drive signal output from the device controller 31. The device controller 31 generates a drive signal based on the remote controlling signal transmitted from the portable terminal device 51 or the beam receiving device 60. Alternately, the device controller 31 generates a drive signal based on the beam receiving position signal transmitted from the beam receiving device 60. The motor driving circuit 35 may be in the form of a H-bridge circuit in one example.

The motor 36 may be, for example, in the form of a DC brushed motor. The motor 36 generates a driving force to rotate the rotation body 12 of the laser marker 10. The laser marker 10 may include an additional motor to generate an additional driving force in addition to the driving force required for a rotational motion of the rotation body 12. The motor 36 may be in the form of a three-phase brushless motor or a stepper motor.

The device display 37 shows a state of the laser marker 10. As shown in FIG. 3, the device display 37 includes an intensity display 37a, a wireless communication display 37b, and a battery state display 37c. In another embodiment, at least one of the intensity display 37a, the wireless communication display 37b, or the battery state display 37c may be removed from the device display 37.

The intensity display 37a lights on in green in the eco-mode, lights off in the normal mode, lights on in orange in the high intensity mode, and lights on in red in the extra intensity mode. The wireless communication display 37b lights on in response to the wireless communication manipulator 32c being placed or having been placed in an ON state and the laser marker 10 being wirelessly connected or having been wirelessly connected to the portable terminal device 51. The wireless communication display 37b blinks in response to the wireless communication manipulator 32c being placed or having been placed in the ON state and the laser marker 10 being wirelessly unconnected or having been wirelessly unconnected to the portable terminal device 51. The wireless communication display 37b lights off in response to the wireless communication manipulator 32c being placed or having been placed in an OFF state. The battery state display 37c lights on when a remaining electric energy of the battery 41 is below a specified threshold and lights off when the remaining electric energy is above the threshold or more.

The battery 41 is a power source to supply an electric power to the laser marker 10. The battery 41 is detachably attached to the laser marker 10. The battery 41 includes a rechargeable battery. When the remaining electric energy of the battery 41 decreases, the battery 41 is replaced with another battery, whereby the laser marker 10 can operate continuously. The battery 41 may include a non-rechargeable battery in addition to or in replacement of the rechargeable battery.

<2-2. Portable Terminal Device>

The portable terminal device 51 includes a terminal controller 53, a terminal manipulator 54, a terminal display 57, a vibrator 56, a speaker 58, and the terminal communicator 59. In another embodiment, at least one of the terminal controller 53, the terminal manipulator 54, the terminal display 57, the vibrator 56, the speaker 58, or the terminal communicator 59 may be removed from the portable terminal device 51.

The terminal controller 53 includes a CPU 53a, a memory 53b, an I/O port, and the like. The terminal controller 53 may be, for example, in the form of a microcomputer. The CPU 53a executes various programs stored in the memory 53b, whereby the terminal controller 53 achieves functions. In the present embodiment, the terminal controller 53 corresponds to one example of the processing circuit and the command outputter in the present disclosure.

The CPU 53a may be configured to execute a program code encoded in a tangible computer readable medium. The computer readable medium refers to any medium that can provide the portable terminal device 51 with a data to operate the portable terminal device 51 in a specified method. Various computer readable mediums may be used to provide the CPU 53a with a command to be executed by the CPU. A general type of the computer readable medium includes, for example, a magnetic medium, an optical medium, a physical medium, a memory chip or a memory cartridge, a carrier wave, and any other computer readable mediums. The computer readable medium may be a volatile medium, a non-volatile medium, or a transmission medium. The volatile medium and the non-volatile medium may be embodied by any method or technique to store information (for example, a computer readable command, a data structure, a program module, or other data described in details below). The transmission medium may be a coaxial cable, a copper wire, and/or an optical fiber cable, and a sound wave or an electromagnetic wave (including a radio wave and an optical wave). The tangible computer readable storage medium may be, for example, an integrated circuit (for example, a field programmable gate array or an application specific IC), a hard disc, an optical disc, an optical magnetic disc, a floppy disc, a magnetic tape, a holographic memory medium, a solid state device, a RAM, a ROM, an electrically erasable programmable read-only memory (EEPROM), a flash memory or other memory technology, a CD-ROM, a digital versatile disc (DVD) or other optical storages, and a magnetic tape in cassette form, a magnetic tape, a magnetic disc memory or other magnetic storages.

The terminal manipulator 54 includes a touch screen. The touch screen is configured such that the user directly touches the touch screen with a finger or a thumb, to thereby perform an input manipulation. The touch screen transmits a signal to the terminal controller 53 in accordance with the input manipulation by the user.

The terminal display 57 includes a display panel. The display panel provides an image in accordance with a display command signal from the terminal controller 53. The display panel may be, for example, in the form of a liquid crystal panel or an organic EL panel.

The terminal manipulator 54 and the terminal display 57 may include a liquid crystal display (LCD) with a touch screen or an organic electroluminescence (EL) display with a touch screen.

The vibrator 56 outputs a vibration in accordance with a vibration output command signal from the terminal controller 53. The speaker 58 outputs a buzzing sound, a voice, or music in accordance with a sound output command signal from the terminal controller 53.

The terminal controller 53 sets an output limitation on the vibrator 56 and/or the speaker 58 in response to the user selecting or having selected the output limitation on the vibrator 56 and/or the speaker 58. The output limitation is set by, for example, the user selecting a vibration mode or a silent mode. In response to the terminal controller 53 setting or having set the output limitation, an output stop of the speaker 58 and/or the vibrator 56 is set.

<2-3. Beam Receiving Device>

The beam receiving device 60 includes a beam reception controller 61, a beam reception manipulator 64, the laser beam receiver 65, the transmitter 67, a remote control/tracking selector switch 66, and a beam receiving position indicator 71. In another embodiment, at least one of the beam reception controller 61, the beam reception manipulator 64, the laser beam receiver 65, the transmitter 67, the remote control/tracking selector switch 66, or the beam receiving position indicator 71 may be removed from the beam receiving device 60.

The beam reception controller 61 includes a CPU 61a, a memory 61b, an I/O port, and the like. The beam reception controller 61 may be, for example, in the form of a microcomputer. The CPU 61a executes various programs stored in the memory 61b, whereby the beam reception controller 61 achieves functions.

The remote control/tracking selector switch 66 switches the remote controlling mode and the automatic tracking mode. Every time the remote control/tracking selector switch 66 is pressed, the beam reception controller 61 alternately switches the remote controlling mode and the automatic tracking mode.

The beam reception manipulator 64 includes a counterclockwise rotation switch 64a and a clockwise rotation switch 64b. In another embodiment, the counterclockwise rotation switch 64a or the clockwise rotation switch 64b may be removed from the beam reception manipulator 64. The counterclockwise rotation switch 64a rotates the rotation body 12 counterclockwise in the remote controlling mode. The clockwise rotation switch 64b rotates the rotation body 12 clockwise in the remote controlling mode.

In response to receipt of the laser beam, the laser beam receiver 65 transmits a beam reception signal to the beam reception controller 61. Specifically, the laser beam receiver 65 transmits the beam reception signal to the beam reception controller 61 in response to the vertical laser beam 120 entering or having entered the laser beam receiving window 80.

The beam receiving position indicator 71 includes a first LED 71a, a second LED 71b, and a third LED 71c. The beam receiving position indicator 71 notifies of the receiving position of the laser beam. In another embodiment, at least one of the first LED 71a, the second LED 71b, or the third LED 71c may be removed from the beam receiving position indicator 71. The first LED 71a, the second LED 71b, and the third LED 71c are horizontally aligned with each other in this order from the right side as viewed from the laser marker 10. The first LED 71a lights on in orange when the receiving position of the laser beam is rightward of the center position. The second LED 71b lights on in green when the receiving position of the laser beam is located at the center position. The third LED 71c lights on in red when the receiving position of the laser beam is leftward of the center position.

<3. Automatic Tracking Process>

Figure 11A:
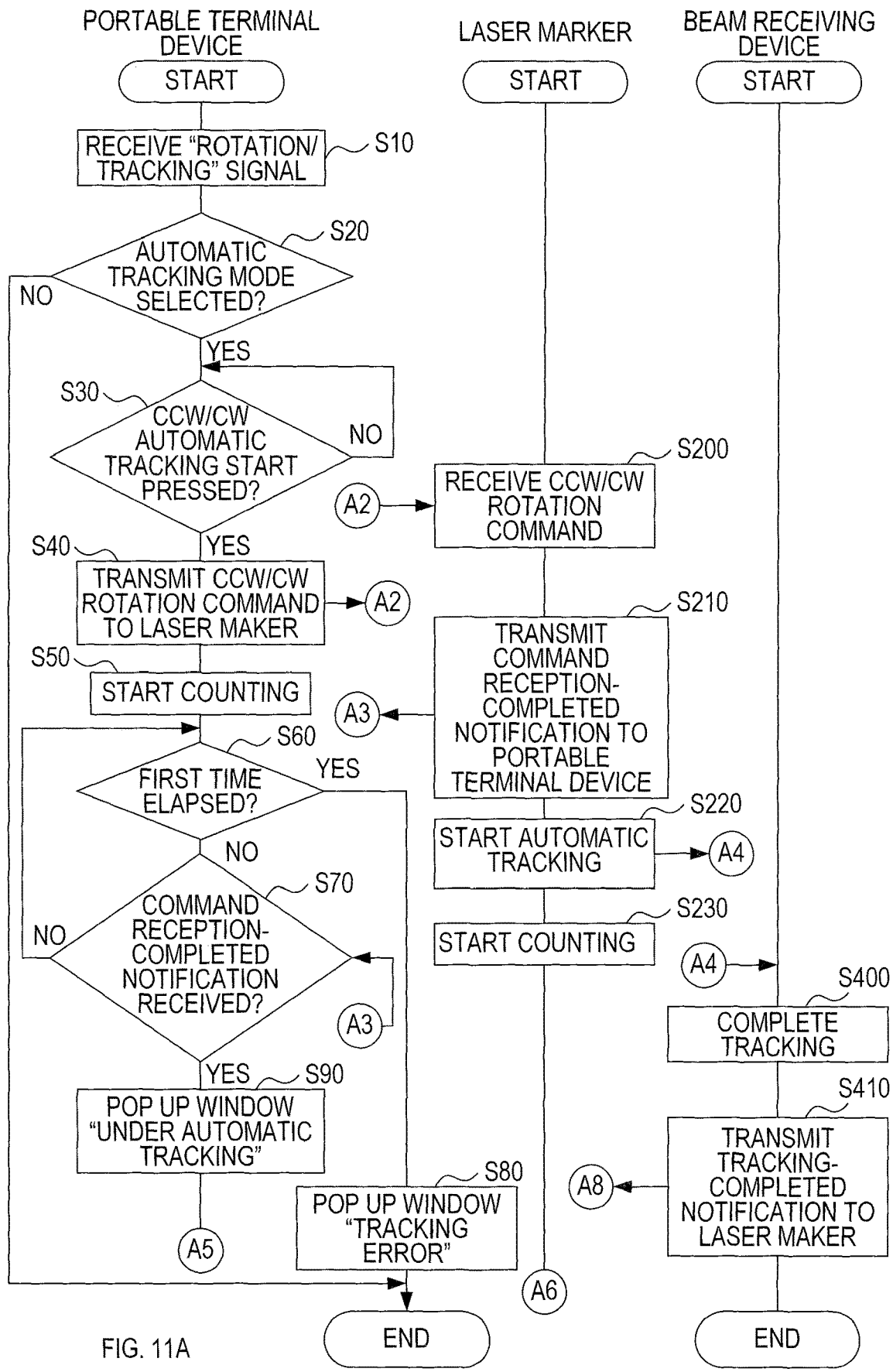
FIG. 11A is a flow chart showing a part of an automatic tracking process according to the present embodiment.
Figure 11B:
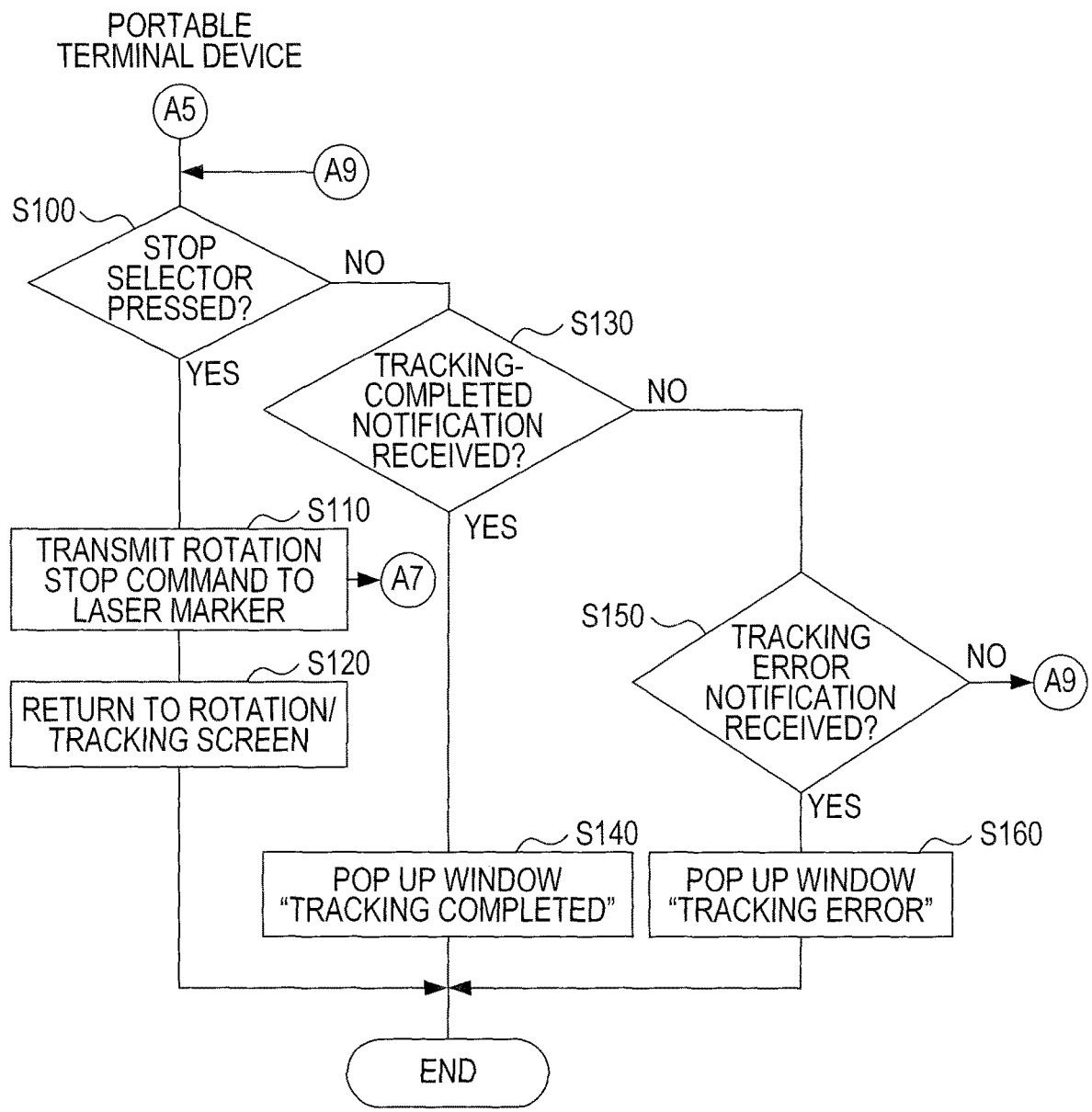
FIG. 11B is a flow chart showing another part of the automatic tracking process.
Figure 11C:
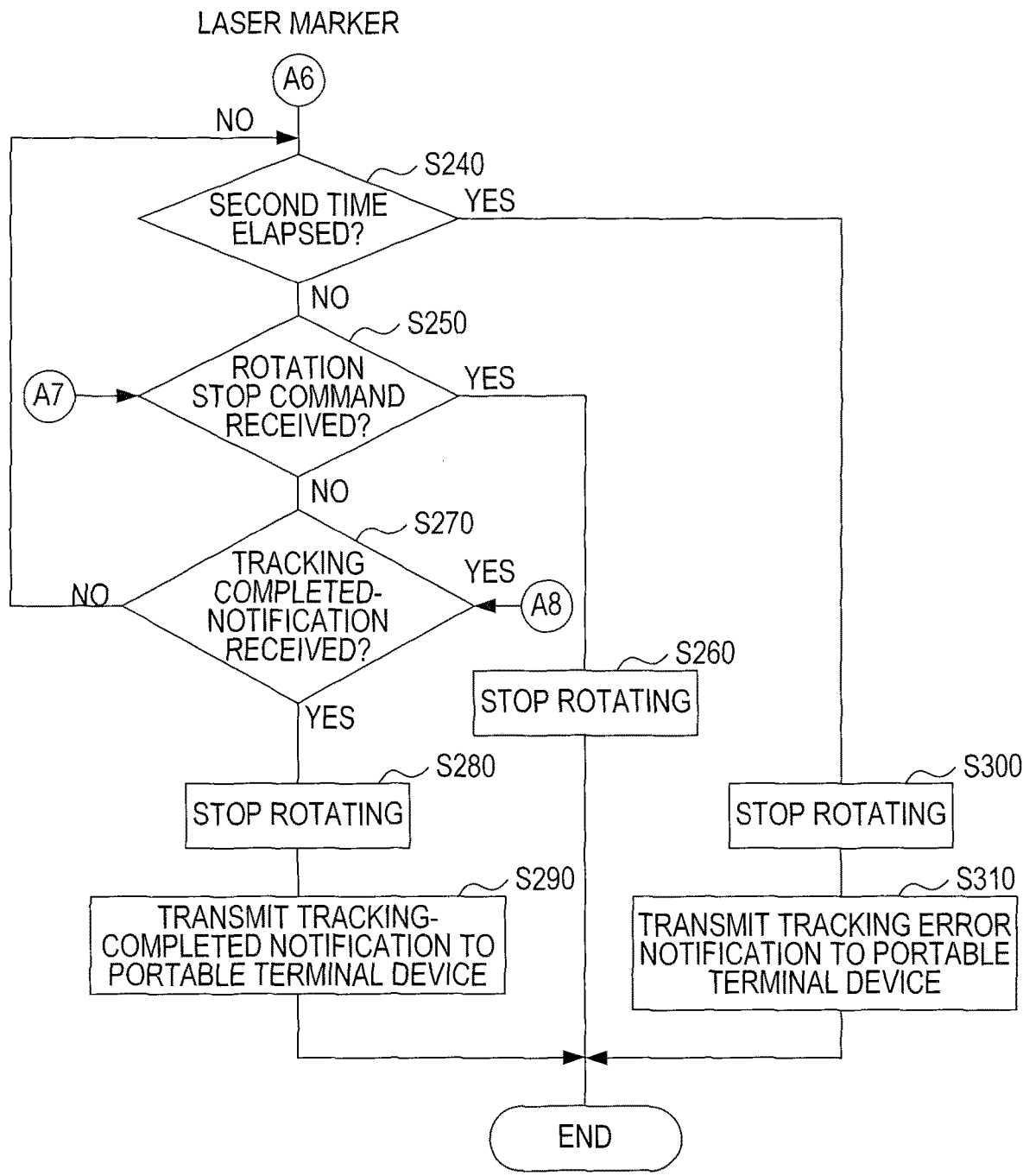
FIG. 11C is a flow chart showing the rest of the automatic tracking process.

Descriptions are given to an automatic tracking process executed by the laser marking system 1 with reference to FIGS. 11A to 11C. The automatic tracking process is started by the user with the portable terminal device 51 with the laser beam being emitted from the laser marker 10.

Figure 4:
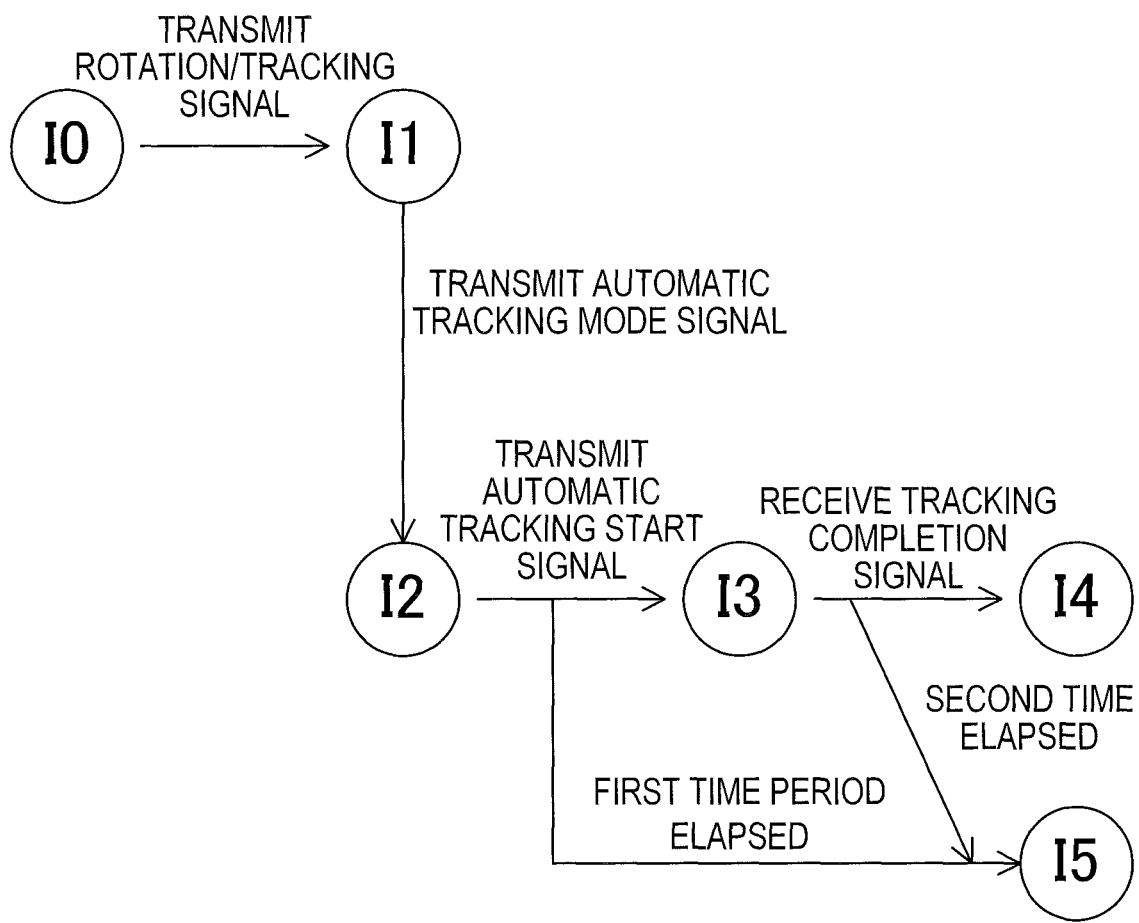
FIG. 4 is a diagram showing transitions of a screen of a portable terminal device according to the present embodiment.
Figure 5:
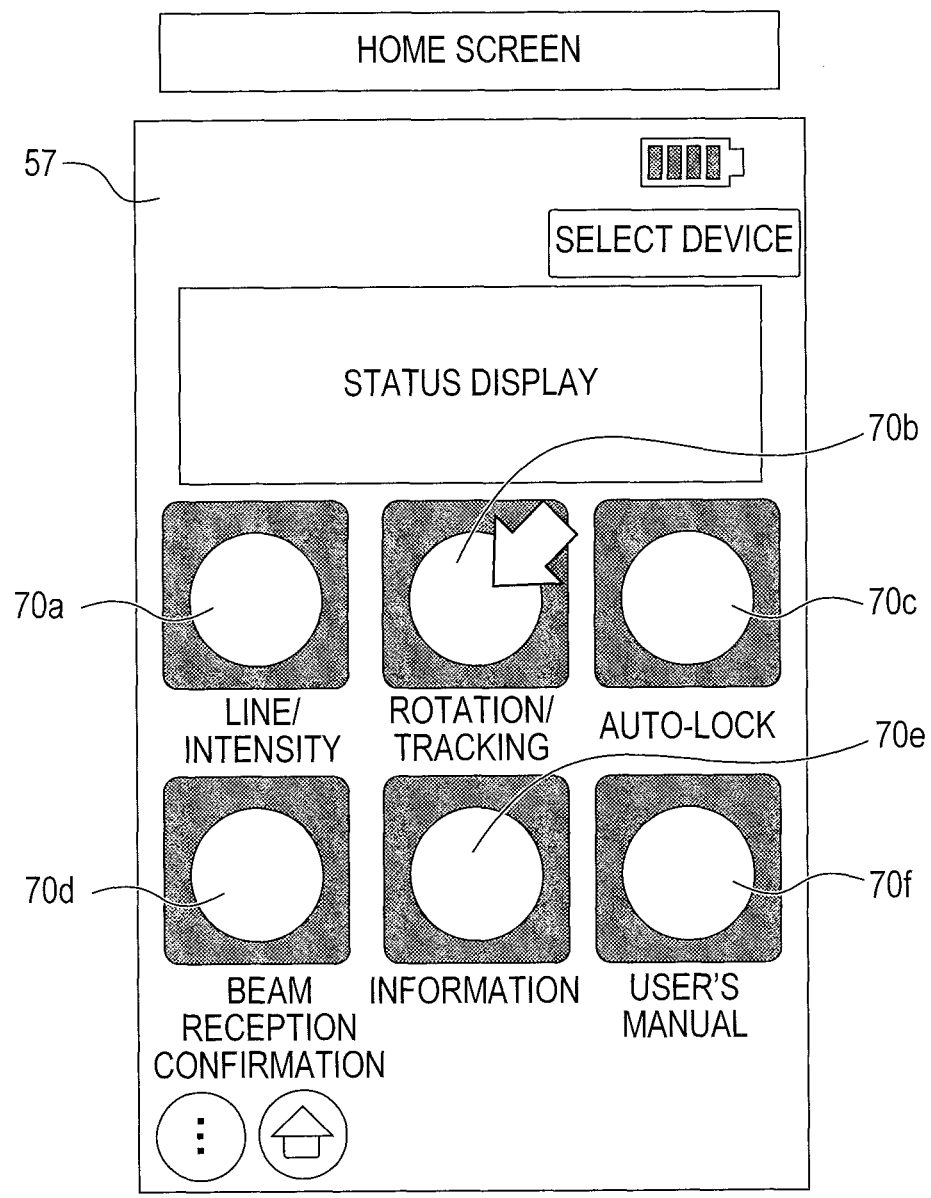
FIG. 5 is a diagram showing a home screen, which is a screen I0 of the portable terminal device.

As shown in FIG. 4, the user makes the terminal display 57 show a screen 0I. The screen 0I is a home screen. As shown in FIG. 5, the home screen includes a line/intensity icon 70a, a rotation/tracking icon 70b, an auto-lock icon 70c, a beam reception confirmation icon 70d, an information icon 70e, and a user's manual icon 70f. In another embodiment, at least one of the line/intensity icon 70a, the rotation/tracking icon 70b, the auto-lock icon 70c, the beam reception confirmation icon 70d, the information icon 70e, or the user's manual icon 70f may be removed from the home screen. The user selects (specifically, touches) the rotation/tracking icon 70b in the screen 0I.

In response to the rotation/tracking icon 70b being selected or having been selected, a "rotation/tracking" signal is transmitted to the terminal controller 53.

Referring now to FIG. 11A, in S10, the terminal controller 53 receives the "rotation/tracking" signal.

Figure 6:
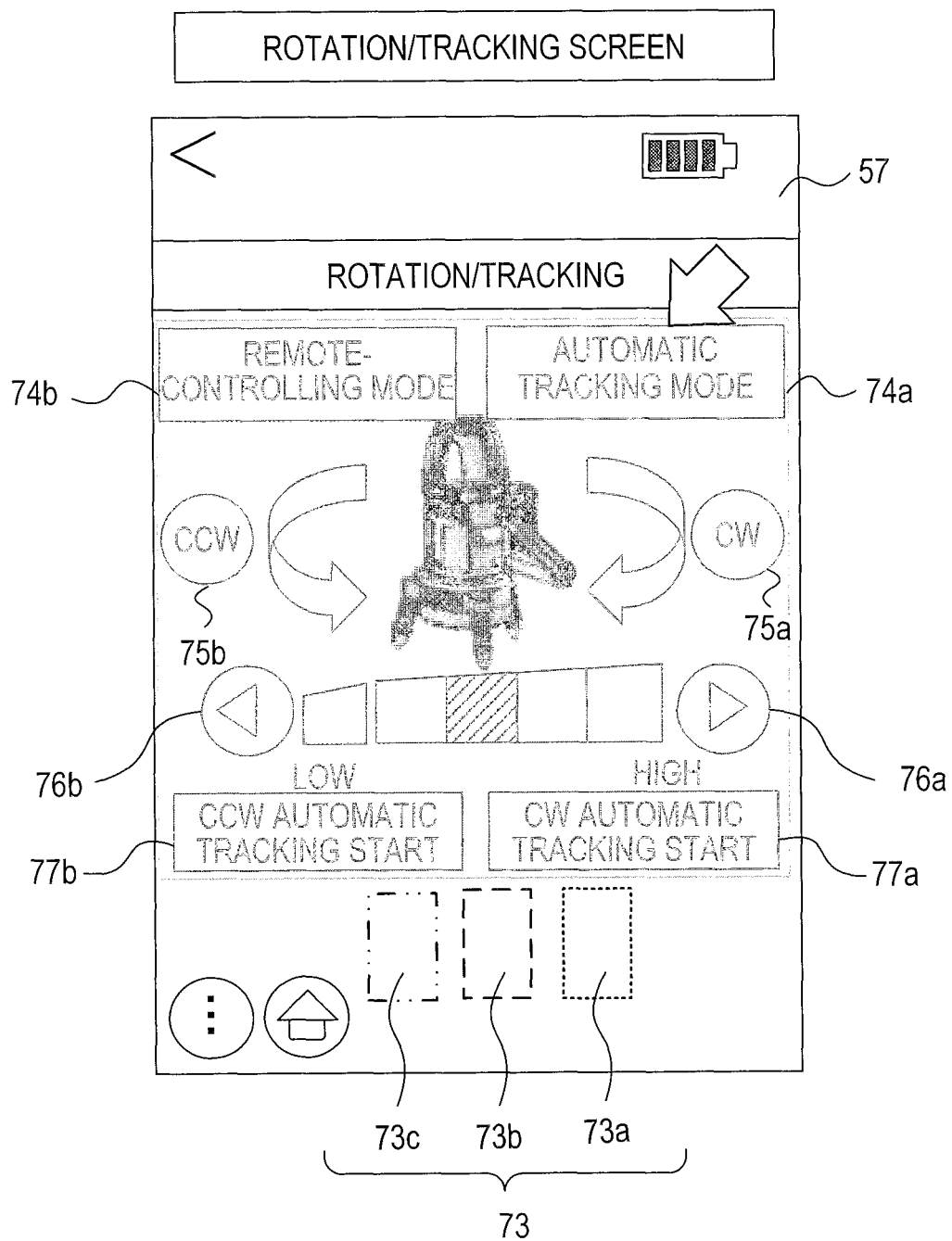
FIG. 6 is a diagram showing a screen I1 of the portable terminal device.

As shown in FIG. 4, in response to receipt of the "rotation/tracking" signal, the terminal controller 53 causes the terminal display 57 to show a screen I1. The screen I1 is a rotation/tracking screen. As shown in FIG. 6, the rotation/tracking screen includes an automatic tracking mode selector 74a, a remote controlling mode selector 74b, a clockwise rotation selector 75a, a counterclockwise rotation selector 75b, an acceleration selector 76a, a deceleration selector 76b, a clockwise automatic tracking start selector 77a, a counterclockwise automatic tracking start selector 77b, and a beam receiving position indicator 73. In another embodiment, at least one of the automatic tracking mode selector 74a, the remote controlling mode selector 74b, the clockwise rotation selector 75a, the counterclockwise rotation selector 75b, the acceleration selector 76a, the deceleration selector 76b, the clockwise automatic tracking start selector 77a, the counterclockwise automatic tracking start selector 77b, or the beam receiving position indicator 73 may be removed from the rotation/tracking screen. The screen I1 does not allow the user to select the clockwise automatic tracking start selector 77a and the counterclockwise automatic tracking start selector 77b.

The acceleration selector 76a and the deceleration selector 76b are used in the remote controlling mode. The acceleration selector 76a and the deceleration selector 76b allows the user to select one of five speed levels. Specifically, the selectable five speed levels include four speed levels for a continuous rotation and a single speed level for a rotation at a specified angle. In the screen I1, the four speed levels for the continuous rotation are shown in four squares adjacent to the acceleration selector 76a. The single speed level is shown in one square adjacent to the deceleration selector 76b.

If one of the four speed levels is selected by the user for the continuous rotation, then the clockwise rotation selector 75a or the counterclockwise rotation selector 75b can be selected. In this case, the terminal controller 53 transmits a rotation command signal to the laser marker 10 to rotate the laser marker 10 at a selected speed. Then, the terminal controller 53 removes the selection of the clockwise rotation selector 75a or the counterclockwise rotation selector 75b made by the user. Specifically, in response to the user lifting or having lifted the finger off the screen, the terminal controller 53 transmits a stop command signal to the laser marker 10. The terminal controller 53 may continuously transmit the rotation command signal to the laser marker 10 with the clockwise rotation selector 75a or the counterclockwise rotation selector 75b being selected by the user. And, the terminal controller 53 may stop transmitting the rotation command signal to the laser marker 10 in response to removal of the selection of the clockwise rotation selector 75a or the counterclockwise rotation selector 75b made by the user.

If the single speed level is selected by the user for the rotation at the specified angle, then the clockwise rotation selector 75a or the counterclockwise rotation selector 75b can be selected. In this case, the terminal controller 53 transmits the rotation command signal to the laser marker 10 to rotate the laser marker 10 at a specified very small angle. The laser marker 10 does not rotate beyond the specified very small angle with the clockwise rotation selector 75a or the counterclockwise rotation selector 75b remained selected by the user. The terminal controller 53 further rotates the laser marker 10 at a specified very small angle by the user temporarily removing the selection of the clockwise rotation selector 75a or the counterclockwise rotation selector 75b and then re-selecting the single speed level for the rotation.

The beam receiving position indicator 73 includes a first position indicator 73a, a second position indicator 73b, and a third position indicator 73c. In another embodiment, at least one of the first position indicator 73a, the second position indicator 73b, or the third position indicator 73c may be removed from the beam receiving position indicator 73. The first position indicator 73a, the second position indicator 73b, and the third position indicator 73c are horizontally aligned with each other in this order from the right side of the rotation/tracking screen. The first position indicator 73a, the second position indicator 73b, and the third position indicator 73c, respectively, have an orange frame, a green frame, and a red frame. FIGS. 5 to 10 indicate the orange frame by a dotted line, the green frame by a broken line, and the red frame by a dotted-dash line. The first position indicator 73a, the second position indicator 73b, and the third position indicator 73c, respectively, correspond to the first LED 71a, the second LED 71b, and the third LED 71c of the beam receiving device 60.

The automatic tracking mode selector 74a can be selected by the user in the screen I1. In response to the automatic tracking mode selector 74a being selected or having been selected, an automatic tracking mode signal is transmitted to the terminal controller 53.

Referring back to FIG. 11A, in S20, the terminal controller 53 determines whether the automatic tracking mode selector 74a is selected. Specifically, the terminal controller 53 determines whether the automatic tracking mode signal is received. If a determination is made that the automatic tracking mode selector 74a is selected in S20 (S20: YES), then the terminal controller 53 proceeds to a process of S30. If a determination is made that the automatic tracking mode selector 74a is not selected (S20: NO), then the terminal controller 53 ends the automatic tracking process.

Figure 7:
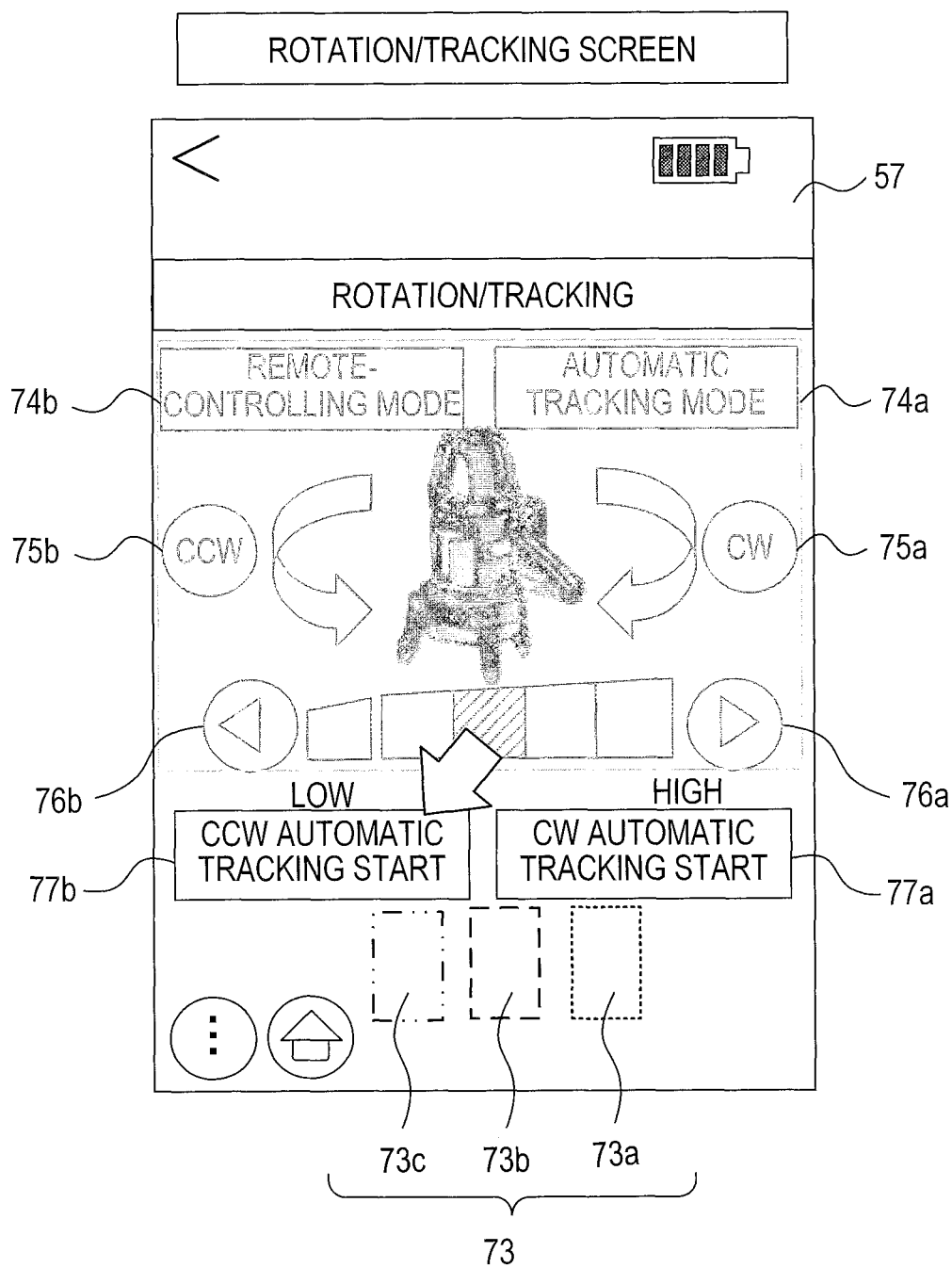
FIG. 7 is a diagram showing a screen I2 of the portable terminal device.

As shown in FIG. 4, in response to receipt of the automatic tracking mode signal, the terminal controller 53 causes the terminal display 57 to show a screen I2. The screen I2 is a rotation/tracking screen. As shown in FIG. 7, the screen I2 does not allow the user to select the automatic tracking mode selector 74a, the remote controlling mode selector 74b, the clockwise rotation selector 75a, the counterclockwise rotation selector 75b, the acceleration selector 76a, and the deceleration selector 76b. In contrast, the clockwise automatic tracking start selector 77a and the counterclockwise automatic tracking start selector 77b are selectable to the user.

If the vertical laser beam 120 deviates leftward of the center line CL, then the clockwise automatic tracking start selector 77a is selected by the user. If the vertical laser beam 120 deviates rightward of the center line CL, then the counterclockwise automatic tracking start selector 77b is selected by the user.

In response to the clockwise automatic tracking start selector 77a or the counterclockwise automatic tracking start selector 77b being selected or having been selected, a tracking start signal is transmitted to the terminal controller 53. In the present embodiment, the clockwise/counterclockwise automatic tracking start selectors 77a, 77b correspond to one example of the rotation command receiver in the present disclosure.

Referring back to FIG. 11A, in S30, the terminal controller 53 determines whether the clockwise automatic tracking start selector 77a or the counterclockwise automatic tracking start selector 77b is selected. Specifically, the terminal controller 53 determines whether the tracking start signal is received. If a determination is made in S30 that the clockwise automatic tracking start selector 77a or the counterclockwise automatic tracking start selector 77b is selected (S30: YES), then the terminal controller 53 proceeds to a process of S40. If a determination is made that the clockwise automatic tracking start selector 77a or the counterclockwise automatic tracking start selector 77b is not selected (S30: NO), the terminal controller 53 repeatedly executes the process of S30.

In S40, the terminal controller 53 transmits a clockwise rotation command signal or a counterclockwise rotation command signal from the terminal communicator 59 to the second device communicator 21b. Then, the terminal controller 53 proceeds to a process of S50. If the counterclockwise automatic tracking start selector 77b is selected, then the counterclockwise rotation command signal is transmitted. If the clockwise automatic tracking start selector 77a is selected, then the clockwise rotation command signal is transmitted.

In S50, the terminal controller 53 starts counting (or measures) an elapsed time from a time point of transmission of the clockwise rotation command signal or the counterclockwise rotation command signal.

Subsequently, in S60, the terminal controller 53 determines whether a first time period has elapsed from the transmission of the clockwise rotation command signal or the counterclockwise rotation command signal. Specifically, the terminal controller 53 determines whether a counted elapsed time exceeds the first time period. The first time period is a preset time period.

In S60, if a determination is made that the first time period has not elapsed (S60: NO), then the terminal controller 53 proceeds to a process of S70.

In S70, the terminal controller 53 determines whether the terminal communicator 59 has received a command reception-completed notification signal from the second device communicator 21b. Specifically, the laser marker 10 transmits the command reception-completed notification signal in response to receipt of the clockwise rotation command signal or the counterclockwise rotation command signal. The terminal controller 53 receives the command reception-completed notification signal, to thereby determine that the laser marker 10 has started the automatic tracking. If a determination is made in S70 that the command reception-completed notification signal has been received (S70: YES), then the terminal controller 53 proceeds to a process of S90. If a determination is made that the command reception-completed notification signal has not been received (S70: NO), then the terminal controller 53 returns to a process of S60.

In S90, the terminal controller 53 causes the terminal display 57 to show a screen I3 as shown in FIG. 4. Then, the terminal controller 53 proceeds to a process of S100.

Figure 8:
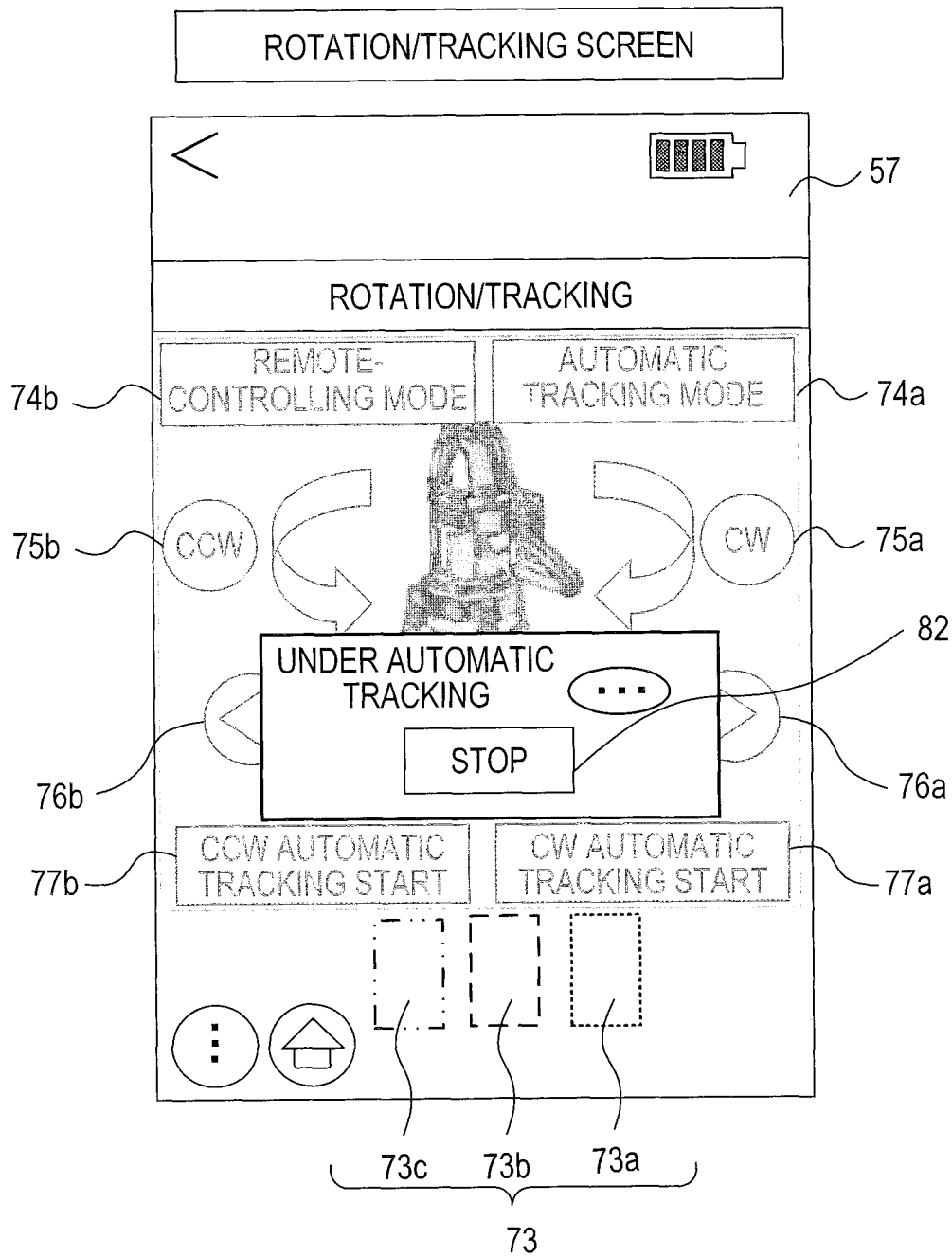
FIG. 8 is a diagram showing a screen I3 of the portable terminal device.

The screen I3 includes a rotation/tracking screen and a pop up window. As shown in FIG. 8, the screen I3 provides the pop up window of "under automatic tracking" over the rotation/tracking screen. The pop up window of "under automatic tracking" includes a stop selector 82. The stop selector 82 allows the user to stop the automatic tracking. In response to the stop selector 82 being selected or having been selected by the user, an automatic tracking stop signal is transmitted to the terminal controller 53. In the present embodiment, the stop selector 82 corresponds to one example of the stop command receiver in the present disclosure.

The screen I3 does not allow the user to select the automatic tracking mode selector 74a, the remote controlling mode selector 74b, the clockwise rotation selector 75a, the counterclockwise rotation selector 75b, the acceleration selector 76a, the deceleration selector 76b, the clockwise automatic tracking start selector 77a, and the counterclockwise automatic tracking start selector 77b.

In S60, if a determination is made that the first time period has elapsed (S60: YES), then the terminal controller 53 proceeds to a process of S80. In S80, the terminal controller 53 determines that the automatic tracking has not started and then causes the terminal display 57 to show a screen I5 as shown in FIG. 4. Then, the terminal controller 53 ends the automatic tracking process.

Figure 10:
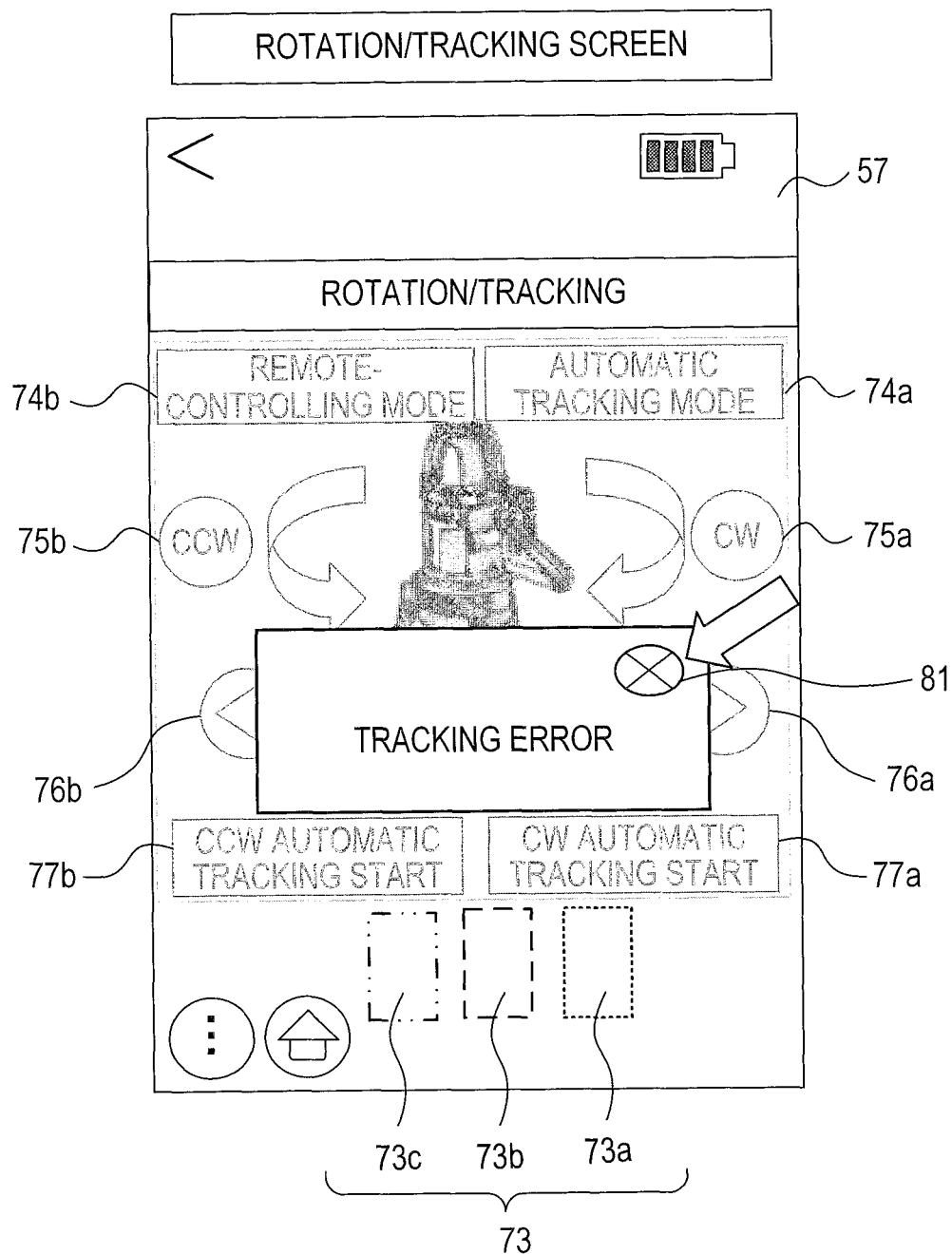
FIG. 10 is a diagram showing a screen I5 of the portable terminal device.

The screen I5 includes a rotation/tracking screen and a pop up window. As shown in FIG. 10, the screen I5 provides the pop up window of "tracking error" over the rotation/tracking screen. The pop up window of "tracking error" includes an end selector 81. The end selector 81 allows the user to end a manipulation application of the laser marker 10.

The screen I5 does not allow the user to select the automatic tracking mode selector 74a, the remote controlling mode selector 74b, the clockwise rotation selector 75a, the counterclockwise rotation selector 75b, the acceleration selector 76a, the deceleration selector 76b, the clockwise automatic tracking start selector 77a, and the counterclockwise automatic tracking start selector 77b.

In S100, the terminal controller 53 determines whether the stop selector 82 has been selected. In other words, the terminal controller 53 determines whether the automatic tracking stop signal has been received. If a determination is made that the stop selector 82 has been selected (S100: YES), then the terminal controller 53 proceeds to a process of S110.

In S110, the terminal controller 53 transmits a rotation stop command signal from the terminal communicator 59 to the second device communicator 21b.

Subsequently, in S120, the terminal controller 53 causes the terminal display 57 to go back to the screen I1 again. Then, the terminal controller 53 ends the automatic tracking process.

If a determination is made in S100 that the stop selector 82 has not been selected (S100: NO), the terminal controller 53 proceeds to a process of S130.

In S130, the terminal controller 53 determines whether the terminal communicator 59 has received a second tracking-completed notification signal from the second device communicator 21b. The second tracking-completed notification signal corresponds to (or is related to or is associated with) a first tracking-completed notification signal to be described later. The first tracking-completed notification signal is transmitted from the beam receiving device 60 to the laser marker 10 in response to the receiving position of the laser beam coinciding or having coincided with the center line CL and consequently, the automatic tracking completing.

If a determination is made in S130 that the second tracking-completed notification signal is received (S130: YES), then the terminal controller 53 proceeds to a process of S140.

In S140, the terminal controller 53 causes the terminal display 57 to show a screen I4 as shown in FIG. 4. Then, the terminal controller 53 ends the automatic tracking process.

Figure 9:
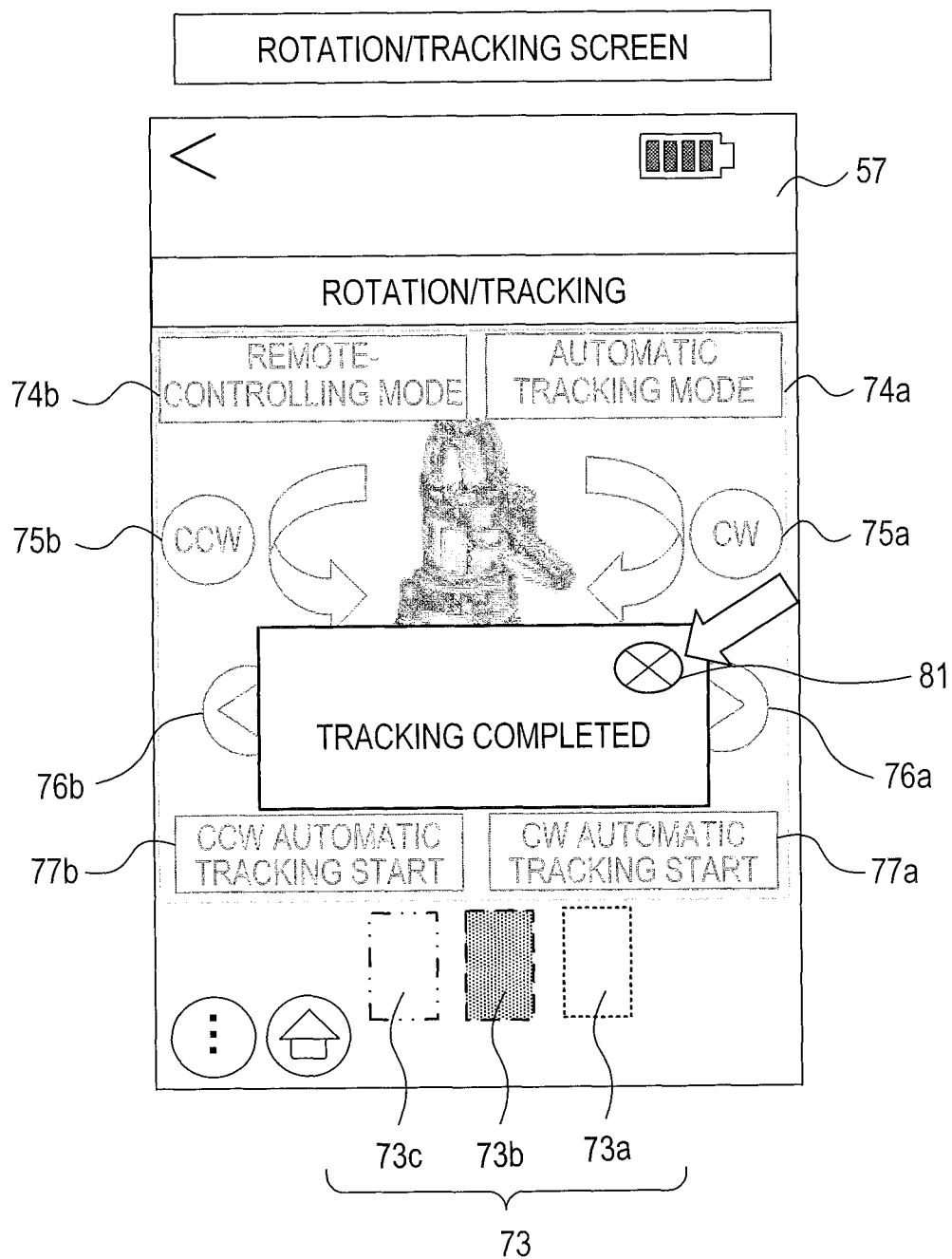
FIG. 9 is a diagram showing a screen I4 of the portable terminal device.

The screen I4 includes a rotation/tracking screen and a pop up window. As shown in FIG. 9, the screen I4 provides the pop up window of "tracking completed" over the rotation/tracking screen. The pop up window of "tracking completed" includes the end selector 81.

If a determination is made in S130 that the terminal controller 53 determines that the second tracking-completed notification signal has not been received (S130: NO), then the terminal controller 53 proceeds to a process of S150.

In S150, the terminal controller 53 determines whether the terminal communicator 59 has received a tracking error notification signal from the second device communicator 21b. The tracking error notification signal is transmitted from the laser marker 10 to the portable terminal device 51 in a case where the automatic tracking does not complete within a second time period.

If a determination is made in S150 that the tracking error notification signal has been received (S150: YES), then the terminal controller 53 proceeds to a process of S160. If a determination is made that the tracking error notification signal has not been received (S150: NO), then the terminal controller 53 returns to the process of S100.

In S160, the terminal controller 53 causes the terminal display 57 to show a screen I5 as shown in FIG. 4. Then, the terminal controller 53 ends the automatic tracking process.

In S200, the device controller 31 receives the clockwise rotation command signal or the counterclockwise rotation command signal via the second device communicator 21b.

Subsequently, in S210, the device controller 31 transmits the command reception-completed notification signal from second device communicator 21b to the terminal communicator 59.

Subsequently, in S220, the device controller 31 starts the automatic tracking. Specifically, the device controller 31 generates a drive signal of the motor 36 based on the beam receiving position signal transmitted from the transmitter 67 to the first device communicator 21a. Then, the device controller 31 outputs the generated drive signal to the motor driving circuit 35. Then, the device controller 31 proceeds to a process of S230.

The beam receiving device 60 continuously transmits the beam receiving position signal from the transmitter 67 in response to the incidence of the laser beam if the remote controlling mode is not set by the remote control/tracking selector switch 66. In other words, the beam receiving device 60 transmits the beam receiving position signal from the transmitter 67 in response to the incidence of the laser beam even if the remote controlling mode selector 74b is selected in the portable terminal device 51. The terminal controller 31 does not use the received beam receiving position signal if the remote controlling mode selector 74b is selected in the portable terminal device 51. Instead, the device controller 31 generates the drive signal based on the remote controlling signal transmitted from the terminal communicator 59. Moreover, the device controller 31 generates the drive signal based on the beam receiving position signal transmitted from the transmitter 67 if the automatic tracking mode selector 74a is selected in the portable terminal device 51.

In S400, the beam reception controller 61 determines that the tracking has completed. Specifically, the beam reception controller 61 determines that the receiving position of the laser beam has coincided with the center line CL.

Subsequently, in S410, the beam reception controller 61 transmits the first tracking-completed notification signal from the transmitter 67 to the first device communicator 21a. Then, the beam reception controller 61 ends the automatic tracking process.

In S230, the device controller 31 starts counting (or measures) an elapsed time from a time point of starting the automatic tracking.

Subsequently, in S240, the device controller 31 determines whether the second time period has elapsed from the start of the automatic tracking. Specifically, the device controller 31 determines whether the counted elapsed time exceeds the second time period. The second time period is a preset time period. If a determination is made that the second time period has not elapsed (S240: NO), then the device controller 31 proceeds to a process of S250.

In S250, the device controller 31 determines whether the second device communicator 21b has received the rotation stop command signal from the terminal communicator 59. If a determination is made that the rotation stop command signal has been received (S250: YES), then the device controller 31 proceeds to a process of S260.

In S260, the device controller 31 outputs a stop signal to the motor driving circuit 35, to thereby stop rotation of the motor 36. This stops rotation of the rotation body 12. Then, the device controller 31 ends the automatic tracking process.

If a determination is made in S250 that the rotation stop command signal has not been received (S250: NO), the device controller 31 proceeds to a process of S270.

In S270, the device controller 31 determines whether the first device communicator 21a has received the first tracking-completed notification signal from the transmitter 67. If a determination is made in S270 that the first tracking-completed notification signal has been received (S270: YES), then the device controller 31 proceeds to a process of S280. If a determination is made that the first tracking-completed notification signal has not been received, then the device controller 31 returns to the process of S240.

In S280, the device controller 31 outputs the stop signal to the motor driving circuit 35, to thereby stop the motor 36. This stops the rotation of the rotation body 12.

Subsequently, in S290, the device controller 31 transmits the second tracking-completed notification signal from the second device communicator 21b to the terminal communicator 59. The second tracking-completed notification signal is generated by converting the first tracking-completed notification signal generated in accordance with the first communication method. The conversion is performed in accordance with the second communication method. Then, the device controller 31 ends the automatic tracking process.

If a determination is made in S240 that the second time period has elapsed (S240: YES), the device controller 31 proceeds to a process of S300.

In S300, the device controller 31 outputs the stop signal to the motor driving circuit 35, to thereby stop the motor 36. This stops the rotation of the rotation body 12.

Subsequently, in S310, the device controller 31 transmits the tracking error notification signal from second device communicator 21b to the terminal communicator 59. Then, the device controller 31 ends the automatic tracking process.

<4. Effects>

The first embodiment described above can bring effects to be described below.

(1) If the laser marker 10 receives the rotation start command signal transmitted from the portable terminal device 51, then the laser marker 10 starts the automatic tracking. Thus, the user can make the laser marker 10 start the automatic tracking via the portable terminal device 51. That is, the user does not have to go closer to the beam receiving device 60. Consequently, it is possible to improve work efficiency of the automatic tracking function of the laser marker 10.

(2) Since the laser marker 10 includes the first device communicator 21a that performs the first wireless communication and the second device communicator 21b that performs the second wireless communication, it is possible to inhibit the second wireless communication between the laser marker 10 and the portable terminal device 51 from interfering with the first wireless communication between the laser marker 10 and the beam receiving device 60.

(3) If the laser marker 10 receives the first completion notification signal from the beam receiving device 60, then the laser marker 10 transmits the second completion notification signal corresponding to the first completion notification signal to the portable terminal device 51. This enables the user to identify that the automatic tracking has completed via the portable terminal device 51.

(4) If the laser marker 10 does not receive the first completion notification signal within the second time period, then the laser marker 10 transmits the error notification signal to the portable terminal device 51. This enables the user to identify that the automatic tracking has not completed via the portable terminal device 51.

(5) If the laser receives the rotation stop command signal from the portable terminal device 51, then the laser marker 10 stops the motor 36 rotating the rotation body 12. Thus, the user can stop the automatic tracking via the portable terminal device 51. That is, the user does not have to go closer to the beam receiving device 60.

(6) If the laser marker 10 receives the rotation start command signal from the portable terminal device 51, then the laser marker 10 transmits the reception-completed notification signal to the portable terminal device 51. This enables the user to identify that the automatic tracking has started via the portable terminal device 51.

(Other Embodiments)

Although an embodiment of the present disclosure has been described above, the present disclosure is not limited to the above-described embodiment and may be practiced in various forms.

(a) In the above-described embodiment, the terminal display 57 of the portable terminal device 51 provides the device information of "under automatic tracking", "tracking error", and "tracking completed". However, notifications of the above device information are not necessarily provided on the terminal display 57. For example, the device information of "under automatic tracking", "tracking error", and "tracking completed" may be notified through a vibration output from the vibrator 56 and/or a sound output from the speaker 58 of the portable terminal device 51.

(b) Two or more functions performed by a single element in the aforementioned embodiment may be achieved by two or more elements, or a function performed by a single element may be achieved by two or more elements. Furthermore, two or more functions performed by two or more elements may be achieved by a single element, or a function achieved by two or more elements may be achieved by a single element. Also, a part of a configuration in the aforementioned embodiment may be omitted. Moreover, at least a part of a configuration in the aforementioned embodiment may be added to or replaced with another configuration in the aforementioned embodiment.

(c) The screen I1 in FIG. 6 may remove the automatic tracking mode selector 74a and the remote controlling mode selector 74b. That is, the screen I1 may allow selection of the clockwise automatic tracking start selector 77a and the counterclockwise automatic tracking start selector 77b. If the clockwise automatic tracking start selector 77a or the counterclockwise automatic tracking start selector 77b is selected by the user in the screen I1, then the terminal controller 53 may transmit a switching command signal to the laser marker 10 with the rotation command signal such that the laser marker 10 switches to the automatic tracking mode. That is, in FIG. 4, the screen I1 may skip over the screen I2 and transition to the screen I3.

Furthermore, the laser marker 10 may be routinely set to the remote controlling mode in various cases: the user neither selects the clockwise automatic tracking start selector 77a nor the counterclockwise automatic tracking start selector in the screen I1 with no the automatic tracking mode selector 74a and the remote controlling mode selector 74b; at a time of completion of the automatic tracking, and at a time of the automatic tracking error. Alternately, the terminal controller 53 may transmit a switching command signal to the laser marker 10 with the rotation command signal such that the laser marker 10 is switched to the remote controlling mode if the clockwise rotation selector 75a or the counterclockwise rotation selector 75b is selected by the user in the screen I1.

What is claimed is:

1. A laser marker comprising:
a support body;
a rotation body rotatably provided to the support body;
a motor configured to rotate the rotation body;
a laser beam emitter provided to the rotation body, the laser beam emitter being configured to output a laser beam;
a device communicator configured to perform a wireless communication with a portable terminal device and with a beam receiving device, the portable terminal device being configured to transmit a rotation start command signal, the rotation start command signal demanding to start rotating the motor, the beam receiving device being configured to generate and transmit a beam receiving position signal in accordance with a receiving position of the laser beam in the beam receiving device, and the device communicator being configured to receive the beam receiving position signal; and a motor control circuit configured to start controlling the motor based on the beam receiving position signal in response to the device communicator receiving or having received the rotation start command signal, the device communicator including a first device communicator and a second device communicator, the first device communicator being configured to perform a first wireless communication with the beam receiving device, and the second device communicator being configured to perform a second wireless communication with the portable terminal device.

2. A laser marker comprising:

a support body;

a rotation body rotatably provided to the support body;

a motor configured to rotate the rotation body;

a laser beam emitter provided to the rotation body, the laser beam emitter being configured to output a laser beam;

a device communicator configured to perform a wireless communication with a portable terminal device and with a beam receiving device, the portable terminal device being configured to transmit a rotation start command signal, the rotation start command signal demanding to start rotating the motor, the beam receiving device being configured to generate and transmit a beam receiving position signal in accordance with a receiving position of the laser beam in the beam receiving device, and the device communicator being configured to receive the beam receiving position signal;

a motor control circuit configured to start controlling the motor based on the beam receiving position signal in response to the device communicator receiving or having received the rotation start command signal; and a first communication control circuit configured to, in response to the device communicator receiving or having received a first completion notification signal, transmit a second completion notification signal to the portable terminal device via the device communicator, the first completion notification signal being transmitted by the beam receiving device in response to the receiving position of the laser beam coinciding or having coincided with a reference position, and the second completion notification signal corresponding to the first completion notification signal.

3. The laser marker according to claim 2, wherein the first communication control circuit is configured to transmit an error notification signal to the portable terminal device via the device communicator in response to the device communicator failing or having failed to receive the first completion notification signal within a specified time period.

4. A laser marker comprising:

a support body;

a rotation body rotatably provided to the support body;

a motor configured to rotate the rotation body;

a laser beam emitter provided to the rotation body, the laser beam emitter being configured to output a laser beam;

a device communicator configured to perform a wireless communication with a portable terminal device and with a beam receiving device, the portable terminal device being configured to transmit a rotation start command signal, the rotation start command signal demanding to start rotating the motor, the beam receiving device being configured to generate and transmit a beam receiving position signal in accordance with a receiving position of the laser beam in the beam receiving device, and the device communicator being configured to receive the beam receiving position signal; and a motor control circuit configured to start controlling the motor based on the beam receiving position signal in response to the device communicator receiving or having received the rotation start command signal, the portable terminal device being configured to transmit a rotation stop command signal, the rotation stop command signal demanding to stop rotating the motor, and the motor control circuit being configured to stop the motor in response to the device communicator receiving or having received the rotation stop command signal.

5. A laser marker comprising:

a support body;

a rotation body rotatably provided to the support body;

a motor configured to rotate the rotation body;

a laser beam emitter provided to the rotation body, the laser beam emitter being configured to output a laser beam;

a device communicator configured to perform a wireless communication with a portable terminal device and with a beam receiving device, the portable terminal device being configured to transmit a rotation start command signal, the rotation start command signal demanding to start rotating the motor, the beam receiving device being configured to generate and transmit a beam receiving position signal in accordance with a receiving position of the laser beam in the beam receiving device, and the device communicator being configured to receive the beam receiving position signal;

a motor control circuit configured to start controlling the motor based on the beam receiving position signal in response to the device communicator receiving or having received the rotation start command signal; and a second communication control circuit configured to transmit a command reception-completed notification signal to the portable terminal device via the device communicator in response to the device communicator receiving or having received the rotation start command signal.

6. A portable terminal device comprising:

a terminal communicator configured to perform a wireless communication with a laser marker, the laser marker including: a support body; a rotation body rotatably provided to the support body; a motor configured to rotate the rotation body; and a laser beam emitter provided to the rotation body, the laser beam emitter being configured to output a laser beam;

a rotation command receiver configured to receive a user rotation command from a user of the portable terminal device, the user rotation command demanding to start rotating the motor;

a command output circuit configured to transmit a rotation start command signal to the laser marker via the terminal communicator in response to the rotation command receiver receiving or having received the user rotation command, the rotation start command signal corresponding to the user rotation command, the laser marker being configured to start controlling the motor based on a beam receiving position signal transmitted by a beam receiving device in response to receipt of the rotation start command signal, the beam receiving device being configured to generate and transmit the beam receiving position signal in accordance with a receiving position of the laser beam in the beam receiving device, and the laser marker including a device communicator configured to receive the beam receiving position signal; and a display configured to provide a display information in response to the terminal communicator receiving or having received a device information, the device information being transmitted by the laser marker, and the display information corresponding to the device information.

7. The portable terminal device according to claim 6, wherein the beam receiving device is configured to transmit a first completion notification signal to the laser marker in response to the receiving position of the laser beam coinciding or having coincided with a reference position, wherein the laser marker is configured to transmit a second completion notification signal to the terminal communicator via the device communicator in response to receipt of the first completion notification signal, the second completion notification signal corresponding to the first completion notification signal, and wherein the device information includes the second completion notification signal.

8. The portable terminal device according to claim 7, wherein the laser marker is configured to transmit an error notification signal to the terminal communicator via the device communicator in response to the laser marker failing or having failed to receive the first completion notification signal within a specified time period, and wherein the device information includes the error notification signal.

9. The portable terminal device according to claim 6, wherein the laser marker is configured to transmit a command reception-completed notification signal to the terminal communicator via the device communicator in response to receipt of the rotation start command signal, and wherein the device information includes the command reception-completed notification signal.

10. The portable terminal device according to claim 9, further comprising a stop command receiver configured to receive a user stop command from the user, the user stop command demanding to stop rotating the motor, wherein the command output circuit is configured to transmit a rotation stop command signal to the laser marker via the terminal communicator in response to the stop command receiver receiving or having received the user stop command, the rotation stop command signal corresponding to the user stop command.

11. A method of commanding a laser marker to rotate via a portable terminal device, the laser marker being configured to transmit a device information, the method comprising:

obtaining a user rotation command input by a user of the portable terminal device, the user rotation command demanding to start rotating a motor of a laser marker, the laser marker including: a support body; a rotation body rotatably provided to the support body; and a laser beam emitter provided to the rotation body, the laser beam emitter being configured to output a laser beam, and the motor being configured to rotate the rotation body;

transmitting a rotation start command signal to the laser marker in response to obtainment of the user rotation command, the rotation start command signal corresponding to the user rotation command, the laser marker being configured to start controlling the motor based on a beam receiving position signal transmitted from a beam receiving device in response to receipt of the rotation start command signal, the beam receiving device being configured to generate and transmit the beam receiving position signal in accordance with a receiving position of the laser beam in the beam receiving device, and the laser marker being configured to receive the beam receiving position signal;

obtaining the device information transmitted from the laser marker; and showing display information on a display of the portable terminal device, the display information corresponding to the device information.

* * * * *